(12) United States Patent
Lurie et al.

(10) Patent No.: US 9,387,861 B1
(45) Date of Patent: Jul. 12, 2016

(54) SYSTEM, METHOD, AND APPARATUS FOR OPTIMIZING ACCELERATION IN A VEHICLE

(71) Applicant: Pedal Logic LP, Lafayette, CA (US)

(72) Inventors: Marc Lurie, Kleinmachnow (DE); Attila Vass, Lafayette, CA (US)

(73) Assignee: Pedal Logic LP, Lafayette, CA (US)

(*) Notice: Subject to any disclaimer, the term of this patent is extended or adjusted under 35 U.S.C. 154(b) by 94 days.

(21) Appl. No.: 14/492,992

(22) Filed: Sep. 22, 2014

Related U.S. Application Data

(63) Continuation-in-part of application No. 13/286,849, filed on Nov. 1, 2011.

(60) Provisional application No. 61/419,411, filed on Dec. 3, 2010, provisional application No. 61/423,082, filed on Dec. 14, 2010, provisional application No. 61/477,023, filed on Apr. 19, 2011, provisional application No. 61/880,729, filed on Sep. 20, 2013.

(51) Int. Cl.
| | |
|---|---|
| *G05D 1/00* | (2006.01) |
| *G06F 19/00* | (2011.01) |
| *G06F 7/00* | (2006.01) |
| *B60W 50/08* | (2012.01) |

(52) U.S. Cl.
CPC .................................. *B60W 50/08* (2013.01)

(58) Field of Classification Search
CPC ..... B60W 50/08; B60W 10/06; B60W 10/26; B60W 10/08

USPC ............................................................. 701/1
See application file for complete search history.

(56) References Cited

U.S. PATENT DOCUMENTS

| | | |
|---|---|---|
| 2003/0040859 A1 | 2/2003 | Farmer |
| 2003/0193766 A1 | 10/2003 | Mantik |
| 2005/0049773 A1 | 3/2005 | Kitapini et al. |
| 2007/0038403 A1 | 2/2007 | Barthel et al. |
| 2009/0127015 A1 | 5/2009 | Van Saanen |
| 2009/0299569 A1 | 12/2009 | Knoll et al. |
| 2010/0198456 A1 | 8/2010 | Komori et al. |
| 2010/0274435 A1 | 10/2010 | Kondoh et al. |
| 2010/0318254 A1 | 12/2010 | Yamamura et al. |
| 2011/0153178 A1* | 6/2011 | Westendorf ........... B60W 30/16 701/96 |
| 2011/0246021 A1 | 10/2011 | Prokhorov |
| 2011/0266396 A1 | 11/2011 | Abildgaard et al. |
| 2012/0055279 A1 | 3/2012 | Van Saanen |

* cited by examiner

*Primary Examiner* — Mussa A Shaawat
*Assistant Examiner* — Abdhesh Jha
(74) *Attorney, Agent, or Firm* — K&L Gates LLP

(57) ABSTRACT

An input control system, method, and apparatus for adjusting an input control value of a motor or engine by damping the acceleration curve. In certain aspects, the damping may gradually increase until the input control optimization system detects a change in the behavior of the vehicle operator, for example, in the form of a conscious or unconscious increase in aggressive use of the accelerator pedal. When such behavior is detected, the input control optimization system reverses the damping and begins to restore gradually the original acceleration curve until aggressive pedal use by the operator is no longer detected.

20 Claims, 16 Drawing Sheets

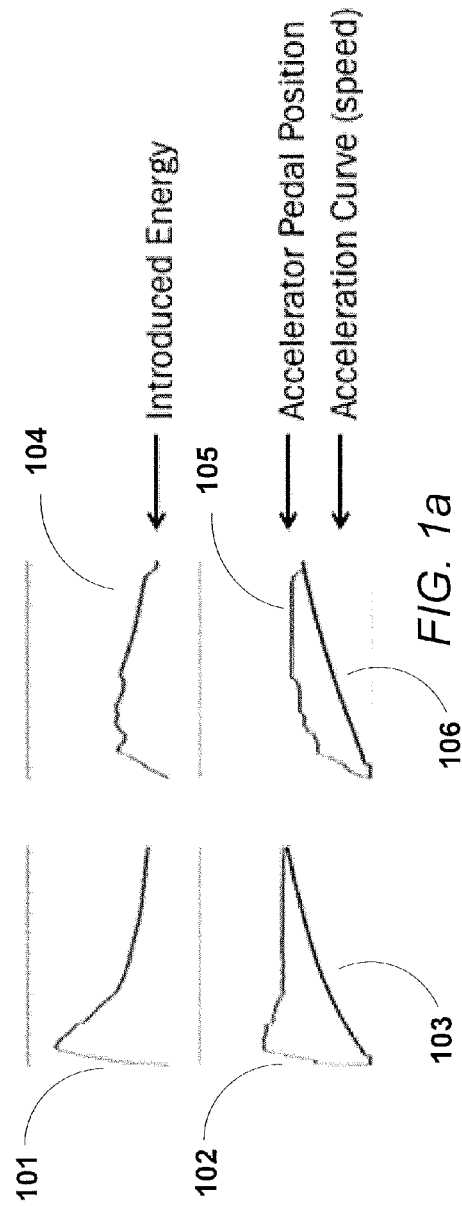

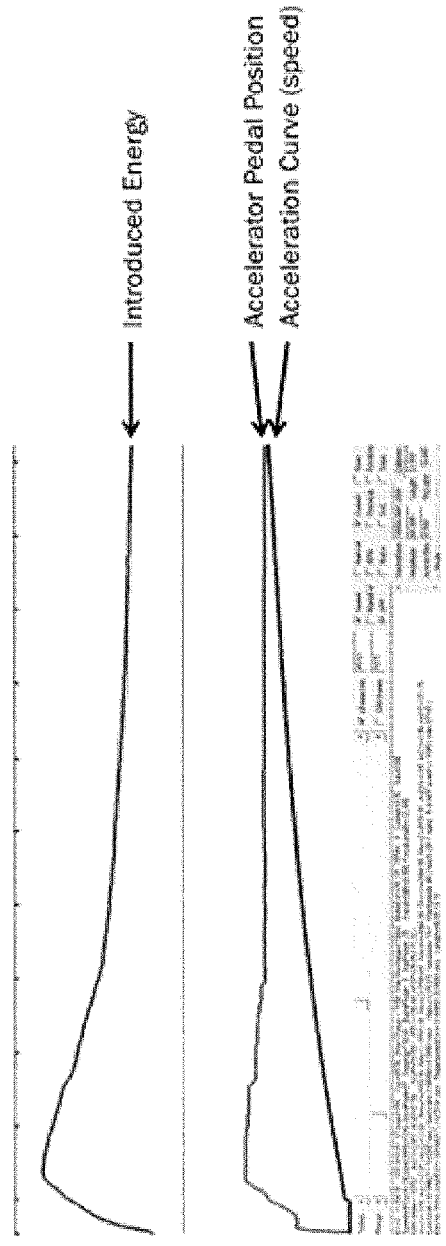

Acceleration Optimization
( In detail )

- In the observed case, a 26% increase in acceleration required 45% increase in introduced energy.

|  | Grad Acc | Max Acc | Difference |
|---|---|---|---|
| Final Speed | 38 | 48 | ↑26% |
| Consumed Energy | 116.18 | 168.64 | ↑45% |

SYSTEM, METHOD, AND APPARATUS FOR OPTIMIZING ACCELERATION IN A VEHICLE

RELATED APPLICATIONS

This application is a continuation-in-part of U.S. non-provisional patent application Ser. No. 13/286,849, filed Nov. 11, 2011, and entitled "Method and Apparatus to Adjust for Undesired Force Influencing a Vehicle Input Control," which claims priority of U.S. provisional application Ser. No. 61/419,411, filed Dec. 3, 2010, and entitled "System And Method For Improving The Fuel Economy And Energy Efficiency Of Moving Vehicles," U.S. provisional application Ser. No. 61/423,082, filed Dec. 14, 2010, and entitled "System And Method For Improving The Fuel Economy And Energy Efficiency Of Moving Vehicles," and U.S. provisional application Ser. No. 61/477,023, filed Apr. 19, 2011, and entitled "System And Method For Improving The Fuel Economy And Energy Efficiency Of Moving Vehicles." This application further claims priority of U.S. provisional application Ser. No. 61/880,729, filed Sep. 20, 2013, and entitled "Automation Acceleration Analysis & Optimization." This application incorporates by reference, in their entireties, each of U.S. patent application Ser. Nos. 61/880,729 and 13/286,849.

FIELD OF THE INVENTION

The present subject matter relates generally to a method, apparatus, and system for controlling the acceleration rate of vehicles, and more particularly to optimize acceleration towards a specific objective or plurality of objectives, including, but not limited to: fuel efficiency, reduced emissions, imperceptibility to the operator, and/or vehicle responsiveness.

BACKGROUND OF THE INVENTION

Among the strategies utilized to promote fuel efficiency and reduce emissions in vehicles is the use of optimized acceleration curves. Typically, optimized acceleration curves are generated through extensive Research & Development by vehicle manufactures during the multi-year development process for a new platform. The results are typically integrated into the electronic control unit (ECU) that monitors the accelerator pedal position (APP) and otherwise translates the observed APP into signals that operate various actuators or switches that control the fuel flow or electrical power provided to the engine or motor.

In many cases, especially when starting from a dead stop or at low speeds, optimizing for fuel efficiency and reduced emissions translates into light acceleration at low RPMs. Despite this understanding in the industry, new platforms typically do not implement fully optimized acceleration curves, which results in reduced fuel efficiency and increased emissions.

The factors driving implementation of less than optimal acceleration curves principally have to do with human factors. First, a vehicle perceived as noticeably "slow" will not be as easily saleable to the entire pool of potential buyers. Second, any gains from further moderating the acceleration curve may prove illusory in real world driving as vehicle operators often consciously and unconsciously increase acceleration in order to compensate for the perceived "slowness" of the platform—a phenomenon especially well understood by commercial fleet operators, whose vehicles are driven by non-owners.

A third factor involves the vehicle itself. In general, a vehicle performs best from nearly every standpoint in the months and years closest to its first purchase; however, over time, drivetrain wear and other factors related to use and age—such as gas escaping around a cylinder head—cause performance to slowly degrade. As a result, an acceleration curve optimized for the close tolerances of a new vehicle may, over time, increasingly prove less optimal as the drivetrain and related components of the vehicle deviate from factory specification, either through wear or replacement.

A fourth factor involves a purely engineering concern that setting the optimization level too high may, indeed, risk running afoul of slight deviations in manufacturing tolerances in parts from a component vendor or even between otherwise identical parts from different vendors.

A fifth factor also involves the manufacturing process. Development of a new vehicle platform is a multi-year process. Optimization analysis and implementation occurs at several points in that process, but typically not as the very last step prior to manufacture. Any changes to the platform's performance between the last optimization and the commencement of manufacturing may generate deviations from the "last known" good optimization developed by the manufacturer.

A sixth distinct factor involves the new vehicle testing regime. Manufacturers of new vehicles optimize performance for EPA mileage reporting, with testing typically occurring on a dynamometer in a controlled laboratory environment. These tests are far from "real world" driving. As may be expected, optimizing an acceleration curve to maximize performance in a controlled environment abstracted from everyday road conditions and environmental factors is likely to produce less-than-optimal performance in real-world driving.

In light of these and other factors, manufacturers typically implement less than optimal acceleration curves from a fuel efficiency and emissions standpoint in both human-operated and autonomous vehicles. For example, several approaches have been employed to optimize acceleration for purposes of fuel efficiency and/or emissions reduction. These include, for example:

U.S. Patent Publication No. 2013/0275013 to Thejovardhana, and assigned to Automatic Labs, Inc., relates to a system for collecting data related to fuel consumption and driving behavioral data from a monitored vehicle and providing (typically auditory or visual) feedback information to the operator in order to "coach" better driving habits. However, this approach is deficient because it functions purely to train a willing operator to mitigate his or her acceleration demands, but does not improve the underlying efficiency of the acceleration curve at a system level or provide a solution for vehicles operated by non-owners that may otherwise not be inclined to drive more slowly.

U.S. Pat. No. 7,603,228 to Coughlin, and assigned to Ford Global Technologies, LLC, relates to a haptic apparatus for providing feedback to the operator. Rather than further optimizing the underlying acceleration curve in a manner that is invisible to the vehicle operator, Coughlin focuses on an apparatus attached to the accelerator pedal that applies pressure to counter the downward pressure (i.e., acceleration demand) by the operator. However, in a real world environment, these types of systems would prove to be counterproductive because operators would unconsciously (or even deliberately) increase the downward pressure on the pedal to achieve the desired speed. Thus, Coughlin is also deficient.

As set forth above, there is a need for an automatic system, method, and apparatus configuration to optimize the acceleration curve of a vehicle in a manner that is transparent and seamless, without requiring operator training or behavioral modification.

SUMMARY OF THE INVENTION

As set forth herein, a problem to be solved may include the asynchrony between the rate of acceleration incorporated into a vehicle and an optimal rate of acceleration for that same vehicle. Therefore, an objective of the present invention is to provide a solution to mitigate or eliminate this asynchrony, such as by providing an adjusted input control value that accounts for a more optimal rate of acceleration.

According to a first aspect of the present invention, an apparatus for optimizing a vehicle's performance comprises: (a) a non transitory data storage device; and (b) a processor operatively coupled to the non transitory data storage device, and configured to: (i) determine an input control value reflecting the vehicle's input control mechanism's position, wherein said input control value is stored to said non transitory data storage device; (ii) determine and store a candidate damping value; (iii) adjust the input control value in accordance with the candidate damping value to yield an adjusted input control value; (iv) determine an output signal reflecting said adjusted input control value; (v) communicate said output signal to an output receiving unit; and (vi) detect whether the vehicle operator's handling of the vehicle's input control mechanism has changed in response to communication of the output signal to the output receiving unit, wherein a change in the vehicle operator's behavior is detected based at least in part on an unexpected change in the input control mechanism's position over a predetermined time period; wherein, if a change in the vehicle operator's behavior is detected, the processor incrementally adjusts the output signal in accordance with a corresponding decreased candidate damping value until the change in the vehicle operator's behavior is mitigated; and wherein the processor (a) determines and stores an increased candidate damping value if no change in the vehicle operator's behavior is detected, (b) adjusts the adjusted input control value in accordance with the increased candidate damping value to yield a second adjusted input control value, and (c) communicates a second output signal reflecting said second adjusted input control value to the output receiving unit.

In certain aspects, the non transitory data storage device may be pre-populated with a plurality of optimized acceleration curves.

In certain aspects, the candidate damping value may be determined using data collected from said vehicle using a closed loop system.

According to a second aspect of the present invention, a method of controlling a vehicle comprises: (a) determining an input control value reflecting a position of an input control mechanism of the vehicle; (b) determining a candidate damping value; and (c) adjusting the input control value in accordance with the candidate damping value to yield an adjusted input control value.

In certain aspects, the method may further comprise the steps of: (d) detecting whether the vehicle operator's behavior has changed in response to Step (c); (e) determining a subsequent candidate damping value if no change in the vehicle operator's behavior is detected at Step (d); and (f) adjusting the adjusted input control value in accordance with the subsequent candidate damping value.

In certain other aspects, the method may further comprise the steps of: (d) detecting whether the vehicle operator's behavior has changed in response to Step (c); and (e) if a change in the vehicle operator's behavior is detected at Step (d), incrementally adjusting the input control value in accordance with a corresponding decreased candidate damping value until the change in the vehicle operator's behavior is mitigated.

In certain aspects, Steps (d) through (f) may be repeated until a change in the vehicle operator's behavior is detected at Step (e), at which point the adjusted input control value is incrementally adjusted in accordance with a corresponding decreased candidate damping value until a predetermined condition is met.

In certain other aspects, the method may further comprise the steps of: (d) detecting whether the vehicle operator's behavior has changed in response to Step (c); and (e) adjusting the adjusted input control value to a last accepted configuration value if a change in the vehicle operator's behavior is detected at Step (c).

In certain aspects, the candidate damping value may be determined based at least in part on an optimized acceleration curve.

In certain aspects, a change in the vehicle operator's behavior may detected based at least in part on an unexpected change in the input control mechanism's position over a predetermined time period. An unexpected change may be, for example, a spike or predetermined increase or deviation in pedal handling (e.g., increase aggressiveness).

In certain other aspects, the method may further comprise the steps of: (d) generating an optimized acceleration curve using data collected on board of the vehicle.

In certain other aspects, the candidate damping value is determined using data collected via a closed loop system or an open loop system.

According to a third aspect of the present invention, an input control optimization system for controlling a vehicle comprises: a non transitory data storage device; and a processor coupled to the non transitory data storage device, the processor configured to: (1) determine a candidate damping value; (2) adjust an input control value in accordance with the candidate damping value to yield an adjusted input control value, wherein said input control value reflects a position of the vehicle's input control mechanism; and (3) communicate said adjusted input control value to an output receiving unit.

In certain aspects, the processor may be further configured to: (a) detect whether the vehicle operator's behavior has changed in response to communication of the adjusted input control value to the output receiving unit; and (b) if a change in the vehicle operator's behavior is detected, incrementally adjust the input control value in accordance with a corresponding decreased candidate damping value until the change in the vehicle operator's behavior is mitigated.

In certain aspects, the processor may be further configured to: (a) detect whether the vehicle operator's behavior has changed in response to communication of the adjusted input control value to the output receiving unit; and (b) adjust the adjusted input control value to a last accepted configuration value if a change in the vehicle operator's behavior is detected.

In certain aspects, the processor may be further configured to: (a) detect whether the vehicle operator's behavior has changed in response to communication of the adjusted input control value to the output receiving unit; (b) determine a subsequent candidate damping value if no change in the vehicle operator's behavior is detected, wherein the subsequent candidate damping value is determined based at least in part on an optimized acceleration curve; and (c) adjusting the adjusted input control value in accordance with the subsequent candidate damping value.

In certain aspects, the Steps (a) through (c) repeat until the vehicle operator's behavior changes in response to communication of the adjusted input control value to the output receiving unit.

In certain aspects, the processor may be configured to generate an optimized acceleration curve using data collected on board of the vehicle, wherein the candidate damping value is determined using data collected from a closed loop system or an open loop system.

Other features and advantages of the present invention will become apparent after reviewing the detailed description of the embodiments set forth below.

BRIEF DESCRIPTION OF THE DRAWINGS

Several example embodiments are described with reference to the drawings, wherein like components are provided with like reference numerals. The example embodiments are intended to illustrate, but not to limit, the invention. These and other advantages of the present invention will be readily understood with reference to the following specifications and attached drawings wherein:

FIG. 1a illustrates an exemplary chart depicting the non-linear nature of power consumption during acceleration via comparison of two actual acceleration curves 103 and 106, the associated accelerator pedal positions 102 and 105, and the introduced energy 101 and 104 for a Nissan Leaf;

FIG. 1b illustrates an exemplary chart depicting in detail the acceleration curve, accelerator pedal position, and introduced energy for the Nissan Leaf during maximum acceleration as shown in FIG. 1a;

FIG. 1c illustrates an exemplary chart depicting the acceleration curve, accelerator pedal position, and introduced energy for the Nissan Leaf during less-than-maximum acceleration as shown in FIG. 1a;

FIG. 1d illustrates an exemplary chart depicting a comparison of the acceleration curves, pedal positions, and introduced energy for the Nissan Leaf during maximum and less-than-maximum acceleration as shown in FIG. 1a;

DETAILED DESCRIPTION OF THE PRESENT INVENTION

Figure 1C:
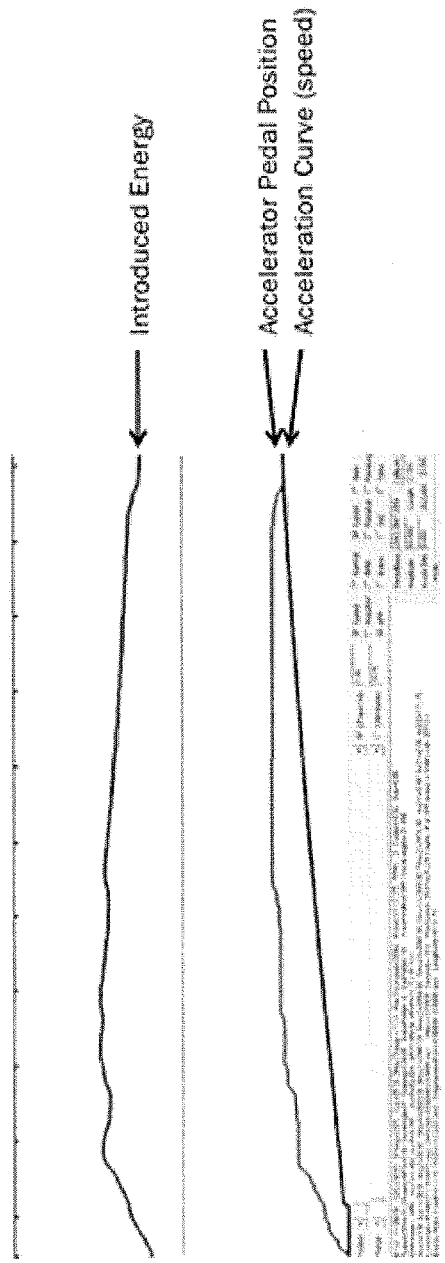

Embodiments of the present application are directed to a vehicle input control optimization system. Embodiments of the present invention will be described herein with reference to the accompanying drawings. Alternate embodiments may be devised without departing from the spirit or the scope of the invention. In the following description, well-known functions or constructions are not described in detail because they would obscure the invention in unnecessary detail. Further, to facilitate an understanding of the description, discussion of several terms used herein follows.

As used herein, the term "input control signal" refers to a signal indicating the operational state, or adjustments to the operational state, of an input control or other sensor. In one example, the input control signal may be at least one pulse-width modulated signal produced over an 8-volt detection circuit. In another example, the input control signal may be at least one voltage-based analog signal produced over a 5-volt detection circuit. Other types of signals, including but not limited to digital signals and other voltage values, may be selected depending on implementation.

As used herein, the term "input control value" or "ICV" refers to a variable indicating the operational state, or adjustments to the operational state, of an input control manipulated by an operator. In general terms, the ICV may be a digital value determined by reference to at least one input control signal. In certain aspects, the ICV may be equal to the input control signal when, for example, a digital input control is employed. The ICV can also be determined from other values or signals on a vehicle, such as on a vehicle network along a communication path from the input control detection unit 201 to an output receiving unit 209. In one example, values from 0-255 correspond to escalating degrees of adjustment. Other values in other ranges might also be selected depending on implementation.

As used herein, the term "candidate damping value" refers to a variable indicating the amount of adjustment to the input control value. The candidate damping value can be computed and/or mapped. The determination can be made by local processing within the system or by processors external to the system. In some embodiments, the candidate damping value is a mathematical value including, but not limited to, a coefficient. Systems and methods disclosed herein can use the outcome of this determination and the input control value to determine the adjusted input control value. Systems and methods disclosed herein can apply post-processing to the candidate damping value. In one example, a value of zero corresponds to no damping while values from 1-100 correspond to escalating degrees of adjustment. Other values in other ranges might also be selected depending on implementation.

As used herein, "aggressiveness" is a comparative term that, when used in connection with an operator's handling of an input control, refers to an increase or decrease in the amount and/or duration of requested power over a time period compared to another time period—i.e., an increase or decrease in aggressive use of the control. In the case of a vehicle, operator would be the driver of the vehicle and an input control would be the accelerator pedal. In one example, an increase in the amount and/or duration of acceleration over a time period may be determined by analyzing and comparing the pedal value range distribution for the relevant period and against a static or dynamic baseline distribution, although other methods are possible.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As set forth below in greater detail, the teaching of the present invention may be implemented via an input control optimization system configured in an open-loop or a closed-loop configuration. The input control optimization system may be embodied within a single device or apparatus, or across plural devices that are communicatively and operatively coupled to one another to achieve the present teachings. In each configuration, an input control value is adjusted to gradually increase the damping of the acceleration curve, while observing the effects, if any, on the driving style of the vehicle operator (e.g., the aggressiveness). In a closed-loop configuration, the effects on fuel economy, if any, may further be observed and associated with particular adjustments to the input control value. Generally, if there is no change in aggressiveness of pedal handling, which may be determined through measuring pedal-value range distribution (or another method), the input control optimization system stores the most recent adjustments as a "last accepted configuration" value (e.g., a last accepted degree of damping value, such as a stored prior candidate damping value) and continues, until aggressiveness is detected, to gradually increase the aggressiveness of adjustments by, for example, applying candidate damping values to the input control value. Alternately, the present invention may be implemented without utilizing a last accepted configuration value and, instead, the input control optimization system simply continues to gradually increase the aggressiveness of adjustments (e.g., candidate damping values) until aggressiveness is detected.

When the input control optimization system eventually detects an increase in aggressiveness of pedal handling by the operator, the input control optimization system may assume that the operator has perceived and reacted (whether consciously or unconsciously) to the damped rate of vehicular acceleration. The input control optimization system thereafter reverses the direction of adjustments, first by restoring the damping, or modulation, of the input control value to a stored last accepted configuration value and, if necessary, further retreating damping in the direction of the original acceleration curve by predetermined intervals until the aggressive driving style of the operator has disappeared or has otherwise reached a predetermined acceptable value. Alternately, the present invention may be implemented without utilizing a last accepted configuration value and, instead, the input control optimization system simply continues to gradually decrease the aggressiveness of adjustments in the direction of the original acceleration curve until aggressiveness is no longer detected or otherwise reaches an acceptable threshold.

As discussed above in the Background of the Invention, existing methods of optimizing a vehicle's efficiency (or other parameters) are deficient because they require, without limitation, training a willing vehicle operator or providing a counter force to the pedal, which often encouraged the operator to simply increase the force applied to the pedal to counter the damping force applied to the pedal.

Thus, what is needed is an automatic system, method, and apparatus configuration to optimize the acceleration curve of a vehicle in a manner that is transparent and seamless, without requiring operator training or behavioral modification. Indeed, an objective of the present invention is to adjust intentional pedal movement, and, more specifically, over-acceleration and inefficient acceleration. The intentional aspect refers to the operator intending for the pedal to be where it is, but not necessarily intending to over- or inefficiently accelerate (e.g., the effects of aggressive driving). For example, inefficient acceleration could occur when an operator pushes the pedal to position X, which causes the injection of amount Y of fuel into the engine and a change in torque output to value R. If the operator changes the pedal position to X+5, it causes the injection of amount Y+5 fuel into the engine and the torque output increases to R+5. But if the operator later changes to X+20, a disproportionate and inefficient injection of the amount Y+12 fuel into the engine may occur, but that only generates R+2 torque output. This lack of correlation between acceleration and pedal position stems from the fact that fuel flow and torque output of the vehicle is not linear.

Similarly, an operator may intentionally over-accelerate (e.g., an increase in aggression) a vehicle as it enters a highway (e.g., higher speed) from a city roadway (e.g., lower speed). In this example, the operator may depresses the accelerator pedal (i.e., accelerate) to a point such that more fuel is transmitted to the engine than can be fully oxidized by combustion. This excess fuel is wasteful (both economically and as a resource) and also produces excessive carbon emissions, thus negatively impacting the environment. While described primarily with regard to gasoline combustion vehicles, the input control optimization system of the present invention may similarly be applied to electric and hybrid vehicles, where, in such vehicles, disproportionate losses also occur as current increases. Further, the input control optimization system of the present invention is not limited to land vehicles, but may also be applied to watercraft, aircraft, and the like.

The input control optimization system may also provide the opposite operation. For example, if the operator pushes the pedal to position X, but through earlier processes of discovery, the input control optimization system knows that position X−1 consumes amount Y−3 of fuel, and produces a torque output of R−1, the input control optimization system may make a minor adjustment of the pedal position from X to X−1 to yield significant savings.

An input control optimization system may also be utilized to increase the acceleration curve in order to generate greater efficiencies in other scenarios. For example, most three-phase 1800-RPM 60-Hz electric motors reach peak efficiency at approximately 50% of the rated load. Below 25% of rated load the efficiency of these types of motors drops dramatically. An input control optimization system could increase torque output to "nudge" the motor to a higher, more energy-efficient speed, which may be especially beneficial when the motor is coupled with a gearbox.

As will be appreciated, there are challenges with all of these scenarios, each of which are overcome by the input control optimization system of the present invention. First, the input control optimization system has to identify and employ these efficiency increasing opportunities through a process of automated analysis. Second, the input control optimization system has to implement adjustments in a manner that is unnoticeable by the operator, either consciously or subliminally (at the muscle-reflex level), in order to avoid the operator intentionally or inadvertently "learning" to drive more aggressively in response. Generally, there is minimal risk when adjusting for over-acceleration, because the eliminated excess has no risk of being perceived as a diminution in acceleration. However, such adjustments do risk being noticeable when applied to "inefficient acceleration" that starts or ends below peak acceleration. Thus, the input control optimization system must be able to the change acceleration without detection by the operator or, alternately, with minimal detection by the operator. That is, a human operator can typically detect certain changes in acceleration via, for example, kinesthetic senses and the otolith organs.

In a general sense, the input control optimization system operates by gradually increasing the flattening of the acceleration curve while observing the effect, if any, on driving style via, for example, pedal handling. If the input control optimization system identifies an unexpected change (e.g., a spike or predetermined increase or deviation) in "aggressiveness" of pedal handling (e.g., as compared to historic pedal handling by the vehicle operator), which may be determined by analyzing the pedal value range distribution over a predetermined period of time, the input control optimization system may conclude that the operator is reacting to a perceived (whether consciously or unconsciously) damping of the rate of acceleration at a given velocity, and thereafter, the input control optimization system may ease off of the gradual flattening and start restoring an original acceleration curve (or other predetermined curve), starting with, for example, the last accepted configuration value, until aggressive driving style is mitigated. Thus, a change in the vehicle operator's behavior may be detected based at least in part on an unexpected change in the input control mechanism's position over a predetermined time period.

Alternatively, instead of restoring the last accepted configuration value, the input control optimization system may instead retreat further (i.e., even closer to the original acceleration curve) in order to increase the likelihood that the human operator's "sense" of the vehicle's acceleration curve is "reset" or re-calibrated to the faster rate, and thereafter more likely to return to normal (i.e., non-aggressiveness) pedal handling. Thereafter, the input control optimization system may slowly increase the damping until it reaches the last accepted configuration value (or until it detects an increase in aggressiveness in which case this loop could repeat with the target of a new, lower last accepted configuration value).

Alternately, the input control optimization system may simply increase or decrease the damping without reference to a last accepted configuration value until it detects an appropriate change in pedal handling by the vehicle operator—i.e., either an increase in aggressiveness in the case of increased damping or a return to "normal" pedal use in the case of decreased damping.

Figure 5:
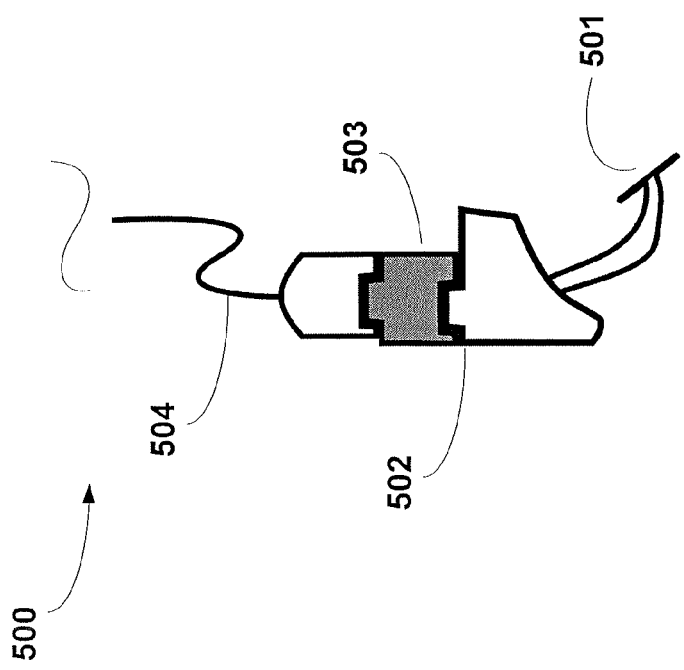
FIG. 5 illustrates an apparatus for providing an adjusted input value, in the form of an inline implementation coupled with an accelerator pedal assembly and a wiring harness, according to an embodiment.

The input control optimization system may further employ learning processes, which may begin with the input control optimization system identifying a good candidate curve. For optimal efficiency, the input control optimization system may employ a closed-loop system that combines, for instance, a multidimensional database along with logic and the ability to capture environmental sensor data relating to fuel flow, pedal position, requested torque output, and/or velocity, among others. Such a system may be implemented as an additional software layer with an Engine (or motor) Control Unit (ECU) within a vehicle. However, the input control optimization system could also be implemented in other forms, such as a computing device operating in either closed- or open-loop modes and physically located along, or otherwise communicating with, the chain of motor control. For example, an open-loop inline device might plugin between the accelerator pedal and the accelerator pedal wiring harness (e.g., as illustrated in FIG. 5). Alternately, a closed-loop inline device might attach to a controller area network bus (CANbus) port with a Y-cable that attaches between the device and the accelerator pedal and accelerator pedal wiring harness. Another implementation may include an additional set of processes implemented at the ECU, which controls the torque output of the vehicle. These processes might take advantage of other signal data available to the ECU, such as fuel flow, pedal position, and the vehicle's built-in accelerometer, in order to implement a closed-loop system. Alternately, this method may also be implemented in an open-loop fashion at the ECU if, for example, computational resources are limited.

The multidimensional database could learn last accepted configuration value candidates for different velocities by observing the operator's interaction with the pedal. Alternately, the database could be pre-populated with such acceptable values during manufacturing. The latter would be particularly useful in certain kinds of open-loop implementations in which only the pedal position is known and the fuel, velocity and acceleration cannot be measured by the optimization system. In another alternative, the database could be re-populated via an update mechanism such as partial or full firmware updates (e.g., push notification to the vehicle). In yet another alternative, the database can be also uploaded to a central location for further analysis.

The input control optimization system may also utilize rules to increase or decrease the aggressiveness of adjustments. Such rules may be associated with any number of criteria, such as type of vehicle, identity of operator, time of day, or geolocation, among others. Such rules may be developed by the manufacturer, owner, and/or operator of the vehicle. The input control optimization system may also employ multiple modes, which can vary the aggressiveness of adjustments (or aggressiveness tolerances).

Thus, the input control optimization system may be implemented in one of four general methods: (1) open-loop without pre-populated acceleration curves; (2) open-loop with pre-populated acceleration curves; (3) closed-loop without pre-populated acceleration curves; and/or (4) closed-loop with pre-populated acceleration curves. As used herein, "open-loop" refers to a system that has access to its own data (e.g., gravitational forces) measurements and the accelerator pedal position). The accelerator pedal position can be derived in several ways, but may be, for example, a direct measurement of the electronic signals from the pedal. The closed-loop system further has access to the vehicle's internal state, such as fuel-flow and velocity. These internal state parameters can yield more refined acceleration optimizations. In certain aspects, the acceleration curves may be computed using one or more acceleration tables, where the table entries correspond to measured parameters for a given acceleration pedal position, such as g-forces, fuel-flow, speed, etc. In a simplified form for an open-loop system, the table may have only entries on the g-forces measured for given acceleration pedal positions. From the beginning (i.e., pedal released) to the end of the table (i.e., pedal fully depressed), the g-forces describe a curve. This curve is generally referred to as the acceleration curve.

This curve can be optimized by analyzing the curve using, for example, a curve-fitting algorithm. Further, the input control optimization system may analyze and interpolate the measured data to determine a desired optimized acceleration curve. Mathematical computations may also be applied, such as noise-filtering, which may function as a low-pass filter or as smoothing operations. The inclinations of predefined segments (or of the entire curve) can also be changed, leading to more aggressive optimizations. For example, the input control optimization system may employ a "clean" state (i.e., without the acceleration tables populated), which involves the system measuring and filling in the necessary tables "on the go" (i.e., as the vehicle is operated). Once sufficient information has been gathered to define an optimized acceleration curve, acceleration optimization can commence.

In another example, the input control optimization system may employ at least one populated table via a predefined method. This may be accomplished by subjecting the vehicle with no (or a light) load to a controlled test and the required measurements. An active control system could take over the accelerator pedal signal generation and measure the forces on the vehicle at different intervals/settings. Using this methodical approach and execution, a populated acceleration table may be generated, which may then be used to compute an associated acceleration curve. Alternatively, in addition to the no/light-load testing, the measurements could be done while the vehicle is under full load or various heavy loads. The two or more resulting tables can be utilized to compute a more precise (multi-dimensional) acceleration curve. Finally, in a closed-loop configuration a richer set of data having multi-dimensional (surface) curves may be employed as the acceleration curve by combining the foregoing methods.

Reference will now be made in detail to implementations of the vehicle input control optimization system as illustrated in the accompanying drawings. When possible, the same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time consuming, but would nevertheless be a routine undertaking of engineering for those of ordinary skill in the art having the benefit of this disclosure.

FIG. 1a illustrates an exemplary chart 100a depicting two acceleration profiles for the Nissan Leaf, including the accelerator pedal position, the introduced energy, and the acceleration curve (speed). The set of images on the left side show a maximum acceleration profile. The set of images on the right show a less-than-maximum acceleration, where the input control value (in this case, the pedal position) is damped according to the present invention.

FIG. 1b illustrates an exemplary chart 100b depicting in detail the acceleration profile on the left side of FIG. 1a, which is the maximum acceleration curve for the Nissan Leaf. FIG. 1b illustrates the accelerator pedal position, the introduced energy, and the acceleration curve (speed).

FIG. 1c illustrates an exemplary chart 100c depicting in detail the acceleration profile on the right side of FIG. 1a, which is the less-than-maximum acceleration curve for the Nissan Leaf. FIG. 1c illustrates the accelerator pedal position, the introduced energy, and the acceleration curve (speed).

Figure 1D:
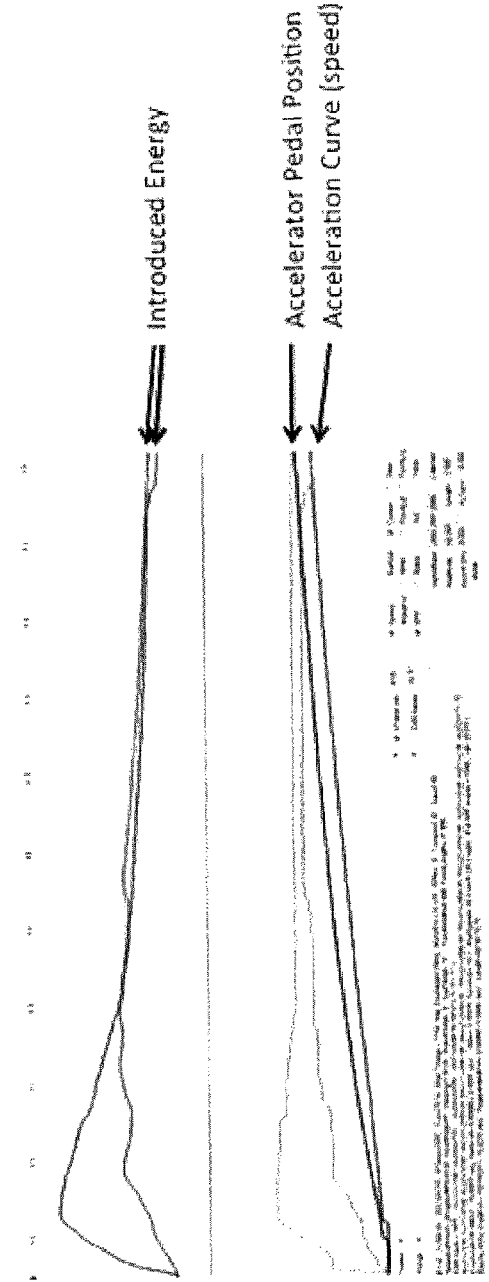

FIG. 1d illustrates an exemplary chart 100d depicting the two acceleration profiles of FIG. 1a overlayed onto a single image for purposes of comparing the effects of the present invention on the introduced energy and the speed of the vehicle.

Figure 1E:
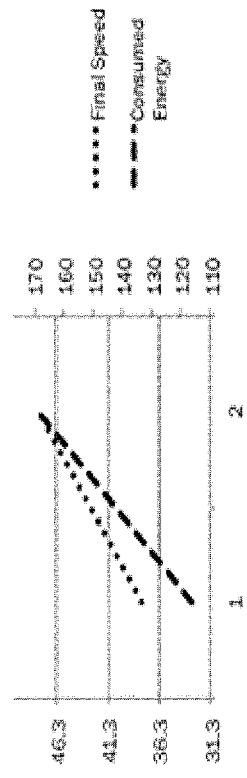
FIG. 1e illustrates an exemplary chart depicting data values correlated with the two acceleration profiles as shown in FIGS. 1b and 1c and as summarized in FIG. 1d.

FIG. 1e illustrates an exemplary chart depicting data values correlated with the two acceleration profiles illustrated in FIGS. 1a, 1b, 1c, and 1d, specifically the final speed and consumed energy. FIG. 1d illustrates the non-linear relationship between acceleration and MPG/eMPG by indicating that in exchange for a 26% reduction in speed, the Nissan Leaf in the second profile consumed 45% less energy than the maximum acceleration profile. Although data from an electric vehicle is presented in this slide, combustion-powered vehicles benefit similarly from input control optimization.

Figure 2:
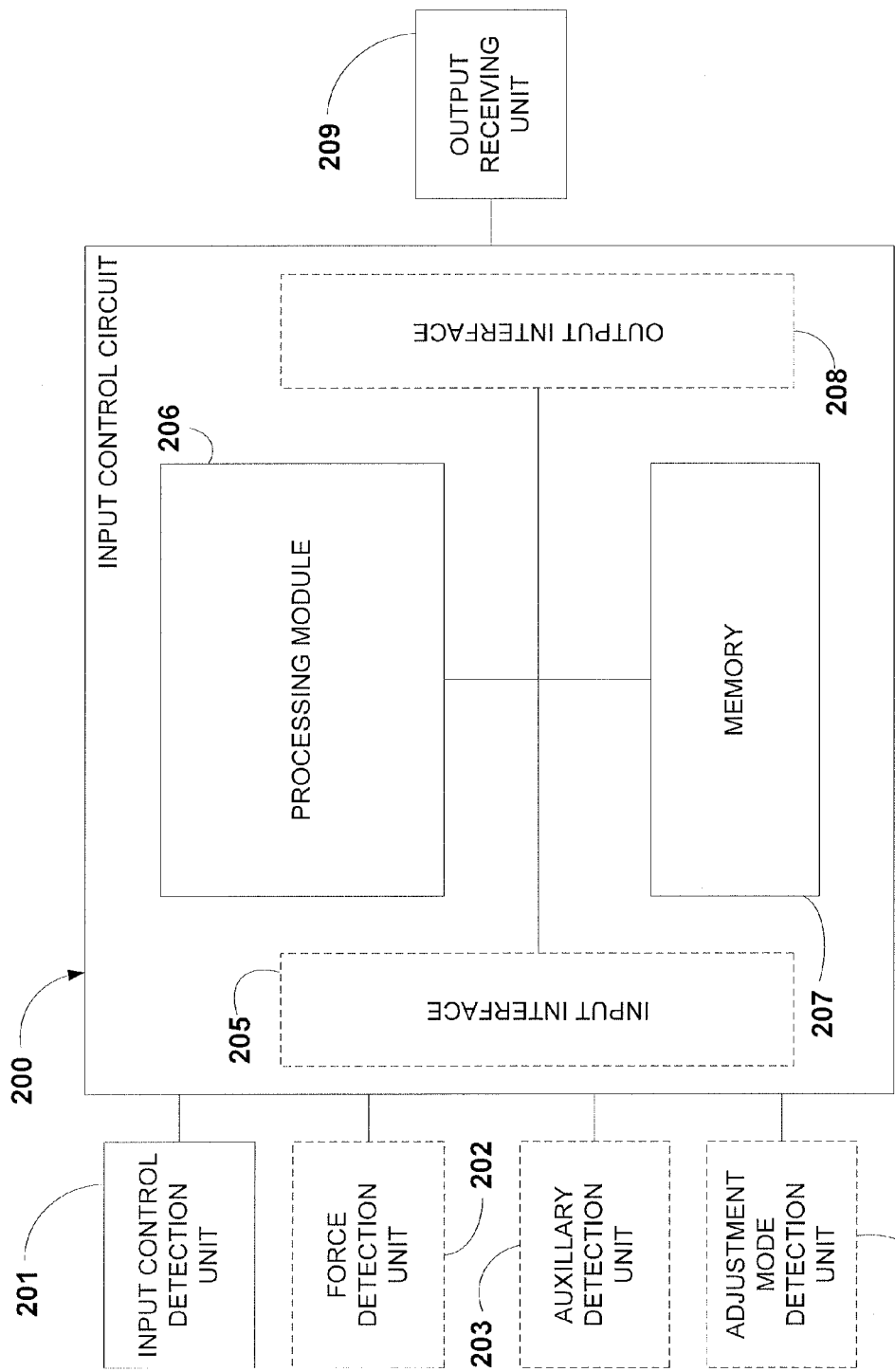
FIG. 2 illustrates a functional block diagram of an input control optimization system according to an embodiment.

FIG. 2 illustrates a functional block diagram 200 of an input control optimization system according to an embodiment. In the illustrated embodiment, an input control circuit 200 is coupled to at least one input control detection unit 201 and at least one output receiving unit 209. In some embodiments, the input control circuit 200 is also coupled with one or more force detection units 202, and one or more auxiliary detection units 203 and/or mode detection units 204. Detection units, such as detection units 201-204, and the output receiving unit 209 can be coupled to communicate directly or via a signal communicated from another component, such as a carrier signal, with the input control circuit 200 and the various components of the input control circuit 200, such as components 205-208, as described hereafter. The input control circuit 200, the detection units 201-204, and the output receiving unit 209 may operate in real-time, near real-time, or batch modes. In an example, the input control circuit 200 may analyze a batch file of signal values received from a storage medium.

In essence, the input control circuit 200 is configured to provide an adjusted input control value, such as by implementing the method for providing an adjusted input control value described in FIGS. 6-12 detailed below. For example, the input control circuit 200 may determine and apply a candidate damping value and/or last accepted configuration value, to an input control value and output the adjusted input control value. In certain aspects, the adjusted input control value may be output to the output receiving unit 209 as an adjusted input control signal (e.g., an analog signal). For example, as illustrated in FIG. 5, a system (or apparatus) may be positioned in-line, whereby, depending on the arrangement, it may be more effective to output an analog signal in lieu a digital signal. The adjusted input control value accounts for the vehicle's optimal acceleration to the torque output otherwise requested by the operator, adjusted further to account for any tendency of the operator to operator with increasing aggressiveness in conscious or unconscious response to past adjustments by the input control circuit.

In some embodiments, the input control circuit 200 is configured to analyze input control values to determine whether pedal handling by the operator is increasing (or decreasing) in aggressiveness. The input control circuit 200 is configured further to determine a damping value to subsequently be used to adjust the input control value. In some embodiments, in addition to the input control values from the input control detection unit 201, the input control circuit 200 may optionally be configured to analyze force signals and additional input signals provided by detection units, such as 202-204, to determine the damping value. The input control circuit 200 is configured further to determine an adjusted input control value using the input control value and the damping value. In an example, the adjusted input control value may be substantially similar or identical to the input control value.

In some embodiments, an input control detection unit 201 is configured to provide an input control value, derived in whole or in part from sensing electronics, which indicates one or both of the operating state of, or adjustment to, at least one input control. In an example, an input control detection unit 201 is at least one Hall-effect sensor attached to an accelerator pedal assembly in order to generate an input control value indicating the accelerator pedal position. In another example, an input detection unit is a pulse-width modulated signal indicating the position of a human-operated control. In another example, an input detection unit is a control wheel steering sensor in an aircraft or watercraft.

In some embodiments, the input control circuit 200 is coupled to at least one force detection unit 202 configured to provide a force signal, derived in whole or in part from one or both electronics (such as sensing electronics) that sense the presence of one or more forces, or a storage medium that stores sensed force signals. Examples of force detection units include, but are not limited to, accelerometers, optical sensors, radar, acoustic sensors, and the like. Force detection units can be used individually or in combination.

The location of a force detection unit 202 can affect the quality of a force signal provided to the input control circuit 200 by, among other things, reducing the influence of noise in the force signal. In some instances, the location can increase the ability of the input control circuit 200 to distinguish between noise and a valid force signal. The proper location for a force detection unit 202 in a particular vehicle can be affected by a number of factors, including, but not limited to, the characteristics of the vehicle, the type and location of the input control detection unit 201, and the type of force sought to be detected. In some embodiments, a force detection unit is securely attached directly to an accelerator pedal assembly in a vehicle.

In some embodiments, the input control circuit 200 is coupled to at least one auxiliary detection unit 203 configured to provide a signal, derived in whole or in part from one or both sensing electronics or other electronics, that indicates one or both of the operating state of, or adjustment to, at least one system or component coupled or connected to the vehicle. For example, an auxiliary detection unit 203 is configured to provide a signal representative of the vehicle speed. In another example, an auxiliary detection unit 203 signal indicates the geographical position ("geo-position") of the vehicle. In yet another example, an auxiliary detection unit 203 signal indicates activation by an operator of a weapon system in a military vehicle. In another example, an auxiliary detection unit 203 signal indicates the available fuel or stored electrical power of a vehicle.

In an exemplary application, accumulated route data and adjusted input control values determined by the input control circuit can be used along with in-vehicle telematics in order to generate a map that associates specific fuel consumption levels and patterns with specific route segments, potentially down to the city block or even to the linear foot. In this manner, route planners, for example, can know exactly what the fuel cost is to run a specific bus on a specific route on a given time and day. Such information is very valuable to route planners.

In some embodiments, the input control circuit 200 includes at least one mode detection unit 204 configured to provide a mode signal, derived in whole or in part from one or both sensing electronics or other electronics, that indicates at least one requested operating mode of the input control circuit 200. In some embodiments, a mode detection unit 204 can provide a mode signal indicating one or both of at least one system-selected mode or at least one operator-selected mode. Although other approaches are also contemplated, example methods to implement both operator-selected modes and system-selected modes are described by the methods in commonly owned patent publication number 2012/0143392, entitled "Method and Apparatus to Adjust for Undesired Force Influencing a Vehicle Input Control."

In some embodiments, a system-selected mode indicates one or more operating modes for the input control optimization system requested by one or more other components or systems, which can be located on a network. In an example, the mode signal can indicate a desire by at least one other component or system to deactivate or modify adjustments due to at least one special condition, such as internal diagnostic fault, vehicle accident, or entry into combat modes. In another example, the mode signal can indicate a request or direction to activate or deactivate a learning mode. In certain embodiments, the mode signal containing system-selected mode values is analyzed by the input control circuit 200.

In some embodiments, the mode detection unit 204 can provide a mode signal indicating at least one operator-selected mode, such as by monitoring the value or state of at least one input control manipulated by the vehicle operator. In an example, a vehicle operator can influence the aggressiveness with which the input control circuit 200 adjusts a signal from an input control detection unit 201, such as by adjusting a mode selection input, such as a mode switch, such as a Power/Normal/ECO mode switch.

In some embodiments, the output receiving unit 209 can be at least one other system, component, or storage medium configured to receive a signal that accounts for one or both of the input control values and the adjusted input control value. For example, such signal can be provided by one or both of the input detection units 201 and the input control circuit 200. In another example, such signal can be communicated directly or via a signal communicated from another component, such as a carrier signal.

In some embodiments, the output receiving unit 209 can include electronics configured to process and/or store such signal. In an example, the output receiving unit 209 can include one or more actuators that individually or in combination regulate the output force of a vehicle. In another example, the output receiving unit 209 can include a throttle body controller. In yet another example, the output receiving unit 209 can include a motor controller.

In some embodiments, the output receiving unit 209 can include a non-transitory data storage device. In an example, the output receiving unit 209 can be located on a wired or wireless network. In an example, the output receiving unit 209 is located in the same vehicle as the input control circuit 200. In an example, the output receiving unit 209 can be located on a network extending from a first vehicle to one or more other vehicles traveling near such first vehicle on a pathway. In an example, the output receiving unit 209 can be located on a network, such as a storage medium located in one or more remote facilities.

In an example, the output receiving unit 209 receives the input control value generated by the input control detection unit 201, such as when the input control circuit 200 is bypassed, such as due to power loss, deactivation by an operator or another system, or system fault and error handling, among other examples.

In some embodiments, the input control circuit 200 includes a processing module 206, a memory 207, an input interface 205, and an output interface 208 interconnected via a bus. Each of the components of the input control circuit 200 is coupled to communicate with one or more other components of the input control circuit 200 via a communication path, such as a data bus, a network link, or a memory location. In an example, the various components of the input control circuit 200, such as components 205-208, may be coupled to communicate with one or both of at least the output receiving unit 209 or one or more detections unit, such as detection units 201-204. In certain examples, the various components of the input control circuit 200, such as components 205-208, can be coupled to communicate directly with one another or via a signal communicated from another component, such as a carrier signal.

In some embodiments, the input interface 205 is configured to receive one or more signals from various detection units 201-204 and to provide such signals to various components of the input control circuit 200. The input interface 205 is also configured to receive input signals from external communications, including remote systems and storage mediums. In certain examples, an input interface 205 can include an analog-to-digital converter for converting analog signals obtained from various inputs into corresponding digital signals suitable for use by the input control circuit 200. In an example, the input interface 205 can apply signal conditioning to a received signal. In an example, the input interface 205 can apply data validation to a received signal. In an example, the input interface 205 includes one or more communications pathways to communicate signals.

In some embodiments, the input interface 205 can synchronize signals received from two or more sources, such as the detection units 201-204, prior to providing such signals to various other components of the input control circuit 200, such as components 206-208. In an example, such signals can be synchronized in a time domain. In an example, such signals can be synchronized in a value domain. In other embodiments, such signal synchronization can be performed instead by other components of the input control circuit 200, such as the processing module 206. In an example, the input interface 205 includes one or more communications pathways to communicate signals.

In some embodiments, the output interface 208 is coupled with the output receiving unit 209 and one or more of various components of the input control circuit 200, such as components 205-207, and one or more detection units 201-204. In an example, the output interface 208 communicates one or more signals with such components 205-207 and such detection units 201-204. In an example, the output interface 208 communicates such signals to an output receiving unit 209. The input interface 205 is also configured to provide output signals to external communications, including remote systems and storage mediums. In some embodiments, the output interface 208 can include a digital-to-analog converter for converting digital signals obtained from various inputs into corresponding analog signals suitable for use by the output receiving unit 209. In some embodiments, the output interface 208 can apply signal conditioning to a received signal prior to providing such signal to the output receiving unit 209. In an example, the output interface 208 includes one or more communications pathways to communicate signals. Although the input interface 205 and the output interface 208 are shown as separate components in the exemplary FIG. 2, it is understood that the input and output functionality can be integrated within a single input/output interface, as is well known in the art.

The processing module 206 can include one or more processing units that are configured to perform the method of providing an adjusted input control value, such as by implementing the methods described in FIGS. 6-12 detailed below. The processing module 206 can operate in real-time, near real-time, or batch modes. In some embodiments, the processing module 206 is configured to communicate one, some, or all processed values to one or more other systems, components, or storage mediums, such as located on a wired or wireless network.

The memory 207 represents any conventional memory, cache, or register unit, including volatile or non-volatile memory, configured for storing data. Such data includes, but is not limited to, data used by the processing module 206 to perform the method of providing the adjusted input control value, or data generated by the processing module 206 while performing the method for providing the adjusted input control value.

The input control optimization system of FIG. 2 is shown and described in terms of general applications. It is understood that the concepts described in relation to FIG. 2 can be used for a wide variety of input control optimization systems. In an exemplary application, the input control optimization system is used in a vehicle having an accelerator pedal as the input control. However, while the input control optimization system is generally described as being used in connection with mobile engines and motors (e.g., in a vehicle), the input control optimization system may similarly be applied to stationary engines and motors including, for example, generators, pumps, drilling, and other engines and motors for use in, for example, a factory setting.

Figure 3:
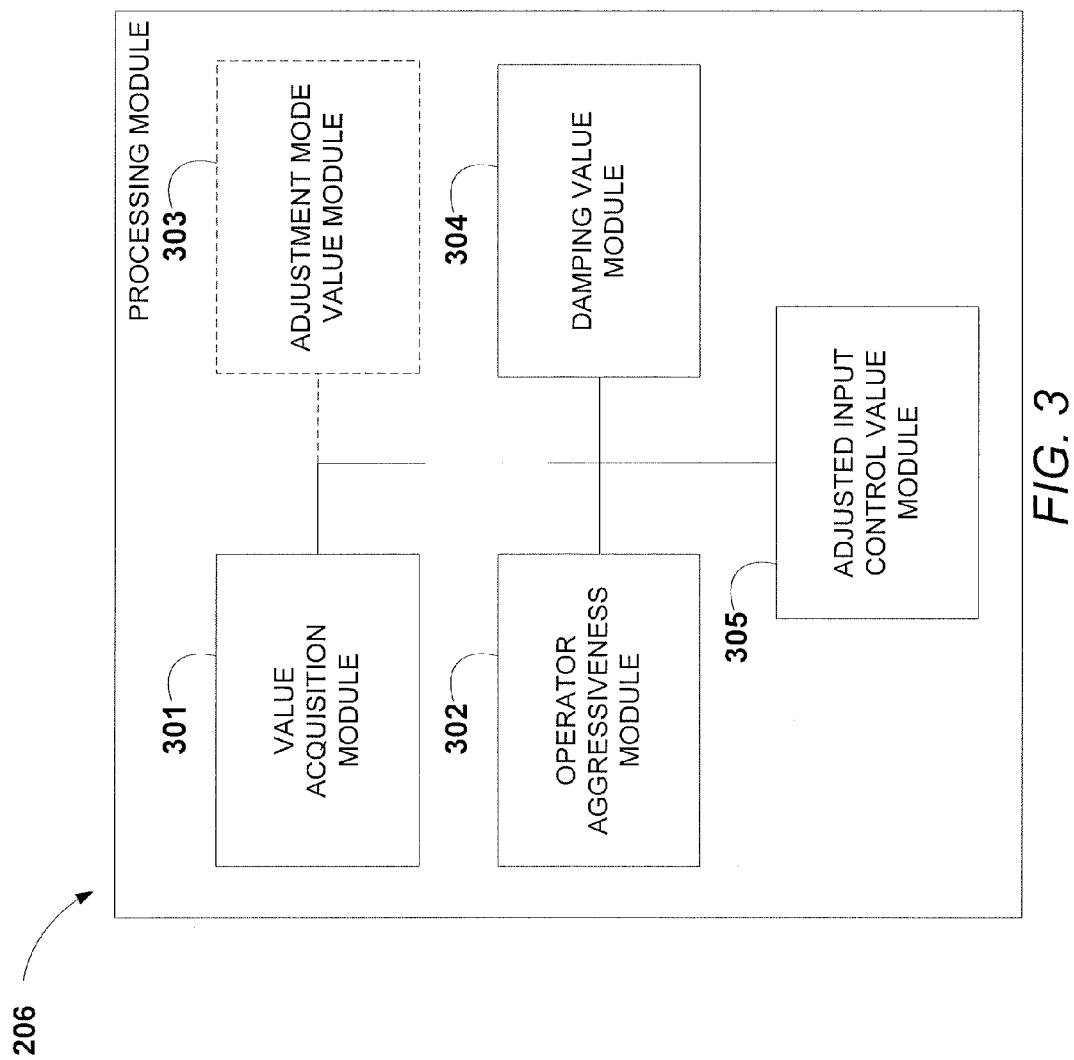
FIG. 3 illustrates a functional block diagram of the processing module of FIG. 2.

In some embodiments, the processing module 206 includes an acquisition module 301, a operator aggressiveness module 302, an optional adjustment mode value module 303, a damping value module 304 and an adjusted input control value module 305, as illustrated in FIG. 3. The acquisition module 301 may be configured to receive detection signals from one or more of the detection units 201-204 and to associate values with each respective signal such as, for example, an input control value, a force value, an auxiliary value, and an adjustment mode value. In those circumstances where detection signals are received from the input control detection unit 201 and at least one of the detection units 202-204, then the acquisition module 301 can also be configured to synchronize the input control signals input from the input detection unit 201 and the various detection signals received from the detection units 202-204 to determine a single input control value. In some embodiments, configuring the acquisition module 301 to synchronize such signals is optional as the synchronization process can be performed by the input interface 403. In an example, the acquisition module 301 may be configured to perform at least a portion of the method in step 603 of FIG. 6.

The operator aggressiveness module 302 may be configured to analyze the input control signals to determine whether there is an increase in the aggressiveness of the use of the input control by the operator. In an example, the pedal aggressiveness module may be configured to perform at least a portion of the method in step 606 of FIG. 6.

The optional adjustment mode value module 303 may be configured to determine an adjustment mode value. In some embodiments, the adjustment mode value is used to determine a group of adjustment mode value blocks that indicate the aggressiveness with which the systems and methods disclosed one or both identify input control values for adjustment and make adjustments to such input control values. In other embodiments, the adjustment mode value is used to determine whether the input control optimization system is activated or deactivated. In an example, the adjustment mode value module 303 may be configured to perform at least a portion of the method in step 609 of FIG. 6.

The damping value module 304 may be configured to determine a candidate damping value, which is subsequently used to adjust the input control value. In an example, the candidate damping value module 304 may be configured to perform at part, or all, of the method in step 606 of FIG. 6.

The adjusted input control value module 305 may be configured to determine an adjusted input control value using the input control value and the candidate damping value. In some embodiments, the adjusted input control value module 305 is also configured to utilize at least one of the adjustment mode value, the force signal value, and/or the auxiliary mode value. In an example, the adjusted input control value module is configured to perform at least a portion of the method in step 607 of FIG. 6.

Figure 4:
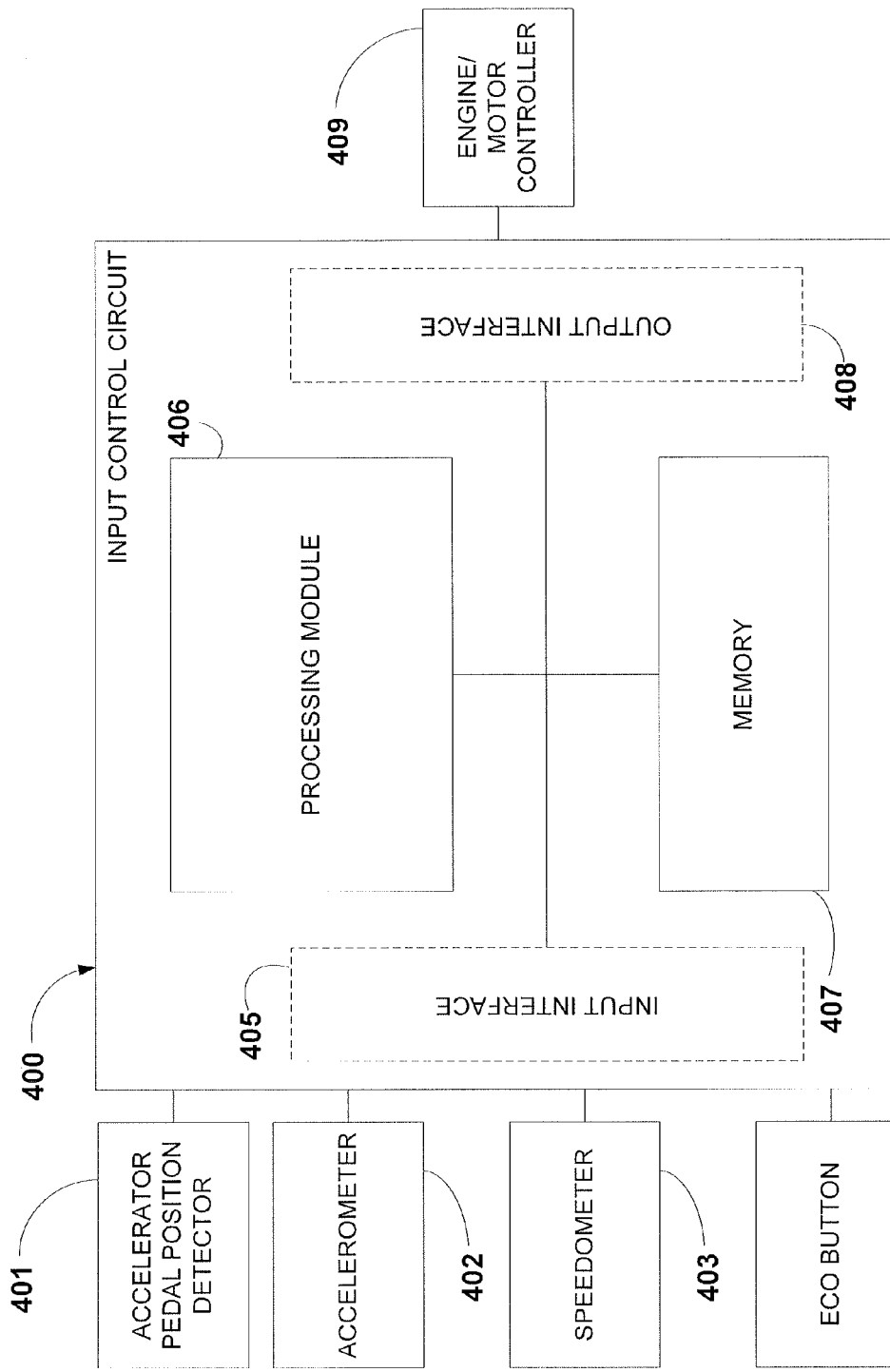
FIG. 4 illustrates a system for providing an adjusted accelerator input position signal according to an embodiment.

FIG. 4 illustrates a system for providing an adjusted accelerator input position signal according to an embodiment. For example, the input control detection unit 201 of FIG. 2 may be at least one accelerator pedal position detector 401, as illustrated in FIG. 4, which is configured to provide to the input interface 405 an input control signal indicating the position of the accelerator pedal as controlled by the vehicle operator. Examples of accelerator pedal position sensors include, but are not limited to: sensors that monitor an electromagnetic field, such as Hall-effect sensors, resistance-based sensors, such as potentiometers, sensors that monitor visual appearance of the accelerator pedal, and other sensors.

In an example, the force detection unit 202 of FIG. 2 may include at least one accelerometer sensor 402, as illustrated in FIG. 4, which is configured to provide a force signal to the input interface 403. In an example, such an accelerometer sensor 402 may provide a signal indicative of forces along three axes. In an example, such an accelerometer sensor 402 may provide a signal indicative of forces along two axes, such as fore-aft and up-down. In an example, such accelerometer sensor 402 provides a signal indicative of forces along a single axis, such as fore-aft.

In an example, at least one such accelerometer can be located on the chassis near the front wheel on the operator side in order to improve the signal-to-noise ratio, among other things. In an example, at least one accelerometer sensor 402 can be attached on or near the accelerator input, such as directly to an accelerator pedal, in order to detect better the acceleration forces affecting the vehicle operator.

In an example, the auxiliary detection unit 203 of FIG. 2 may include at least one vehicle speed sensor 402, as illustrated in FIG. 4, which is configured to provide an auxiliary signal to the input interface 403. Examples of vehicle speed sensors include, but are not limited to, a vehicle's built-in speedometer, but also be provided using other means, such as a GPS transceiver.

In an example, the adjustment mode detection unit 204 of FIG. 2 may include at least one adjustment mode sensor 404, as illustrated in FIG. 4, which is configured to provide an auxiliary signal to the input interface 403. Examples adjustment mode sensors include, but are not limited to, a vehicle's built-in power mode switch (e.g., an "ECO" button), which allows the vehicle operator to alter the vehicles performance profile for "power," "normal," and "economy" modes of driving.

In an example, the input interface 405 applies signal conditioning to analog signals received from the accelerator pedal sensor 401, accelerometer 402, vehicle speed sensor 403, and adjustment mode sensor 404. In an example, such input interface converts such signals into corresponding digital values, and synchronizes such signals in a time domain. In an example, such input interface 405 provides a signal that accounts for such synchronized signals. In an example, the output receiving unit 209 of FIG. 2 may include an engine/motor control module 409 in FIG. 4 that provides control signals to actuators in order to adjust the output force of at least one combustion engine or electric motor, individually or in combination.

In an example, the input control detection unit 201 of FIG. 2 may be at least one accelerator pedal position detector 401, as illustrated in FIG. 4, which configured to communicate to the input interface 405 a signal indicating the position of the accelerator pedal as controlled by the vehicle operator. In an example, the output receiving unit 209 of FIG. 2 may be an engine/motor control module 407 in FIG. 4 that controls the output force of at least one combustion engine or electric motor, individually or in combination. In an example, the output interface 208 in FIG. 4 is configured to communicate to the engine/motor control module 409 one or both of the original and adjusted signal from the accelerator pedal position detector 401.

In an example, the input control detection unit 201 of FIG. 2 can be located elsewhere in the line of communication between at least one input control and the output receiving unit 209. In an example, the input control detection unit 201 communicates with at least one external electronic control unit (ECU) to obtain at least one input control value that may have already been processed or modified by such ECU. In an example, the input control circuit 200 can apply computations to derive the original input control value before proceeding to apply corrections.

In certain alternate embodiments, the input control detection unit 201 communicates with at least one external ECU to obtain at least one signal not generated by an input control sensor but from which the input control circuit 200 can derive the actual or approximate original signal from such input control sensor(s). In an example, the input control detection unit 201 communicates with at least one external ECU to obtain at least one control signal utilized to adjust the output force of a vehicle powertrain. In an example, the input control circuit 200 can derive the original accelerator pedal position signal through reverse-computation of control signals transmitted to actuators that are utilized to adjust the output force of a vehicle engine or motor.

In certain other embodiments, instead of interfacing with at least one output receiving unit 209, the output interface 208 may instead interface elsewhere in the line of communication between at least one input control sensor 201 and the output receiving unit 209. In an example, the input control circuit 200 is implemented as an aftermarket inline device between an accelerator pedal position sensor 502 in FIG. 5 and a wiring harness 504 that, among other things, communicates a signal generated by the accelerator pedal position sensor 502 to an ECU, such as the engine/motor control module 409 in FIG. 4. The accelerator pedal position sensor 502 is coupled to an accelerator pedal 501. In another example not pictured, the input control circuit 200 is built directly into an accelerator pedal assembly 500 in FIG. 5. In an example, the input control circuit 200 draws power from the same circuit as the accelerator pedal position sensor 502. In an example, the input control circuit 200 draws power from a circuit other than, or in addition to, the circuit from which the accelerator pedal position sensor 502 draws.

In general, the input control circuit can be implemented as part of an existing ECU or as a separate unit. Further, the input control circuit can be physically positioned anywhere in the communication path between the input control, such as an accelerator pedal, and the actuator that uses the input control value generated by the input control, such as an engine or throttle controller.

The input control optimization system can operate dynamically, applying a different set of variables in correlation with times, such as varying activation thresholds and rates of correction. The value of a particular variable can be determined through several methods including, but not limited to, computational calculations by the input control optimization system, time lapse since the last activation, aggressiveness level, reference to at least one table of values, the identity and/or historical driving patterns of the vehicle operator, and combinations thereof. Within each method, the specific value of a variable can depend on any number of factors including, but not limited to: vehicle speed, load, attitude, and position, as well as operator goals, such as maximizing acceleration or reducing fuel consumption.

Figure 6:
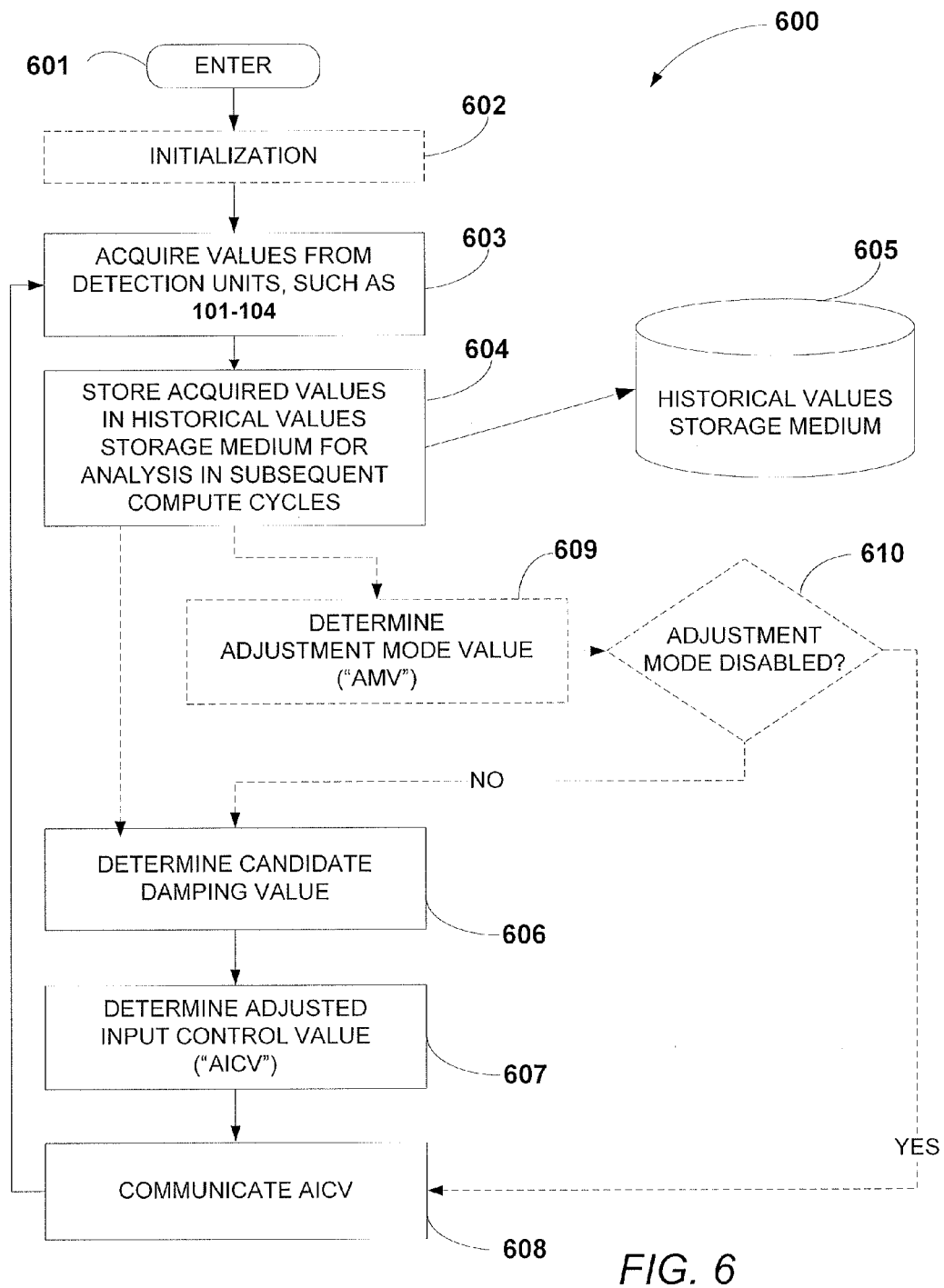
FIG. 6 illustrates a flow diagram depicting a method for providing an adjusted input control according to an embodiment.

FIG. 6 illustrates a flowchart that depicts an example method of providing an adjusted input control value ("AICV") according to an embodiment. The method is entered at step 601. At step 602, the method optionally includes initialization. Exemplary initialization processes can include, but are not limited to: performing a diagnostic to confirm proper operation of system components, loading settings from preset or previously computed and stored values, setting up variables, enabling or disabling certain modes, initializing and setting default expiration values for timers, initializing necessary peripherals for data acquisition (such as opening hardware access to a Control Area Network stream in a closed-loop embodiment) monitoring and computing baseline vectors and signal noise, and acquiring software descriptors for the data flowing through the stream, which make it possible to read these values in later steps. In some embodiments, information used for initialization is communicated via telematics, such as to a vehicle for use by the vehicle.

At step 603, the method acquires values utilized by the systems and methods disclosed herein. In an example, such values include, but are not limited to, at least one input control value ("ICV"), which indicates the operational state, or adjustments to the operational state, of an input control manipulated by a vehicle operator. The ICV may be determined by reference to at least one input control signal. The ICV can also be determined from other values or signals on a vehicle, such as on a vehicle network along a communication path from the input control detection unit 201 to an output receiving unit 209.

In some embodiments, the ICV represents the operator's target adjustment for an input control to control the force output of a vehicle power generator, such as a motor or engine. In an example, the system determines the ICV by reference to at least one accelerator pedal position signal. The accelerator pedal position signal can be obtained from at least one input control detection unit 201, such as the accelerator pedal position detector 401. In another example, the ICV can be determined by at least one other value or signal on the vehicle, such as on a network along a communication path from the accelerator pedal position sensor to the various powertrain components. Such other values or signals include, but are not limited to: the values or signals intercommunicated between an engine or motor controller and other controllers, or transmitted by the engine or motor controller to the fuel injector, transmission, and other powertrain components. Although derived in part using the accelerator position signal, these signals can contain influences from other systems and processes.

At step 603, the system can optionally also acquire at least one force value determined by reference to at least one force signal supplied by the force detection unit 202. The system can also acquire one or both of at least one auxiliary value or at least one adjustment mode value determined by reference to at least one auxiliary detection unit 203 or at least one adjustment mode detection unit 204, respectively.

In some embodiments, if in addition to acquiring an input control value the method also acquires at least one force value, auxiliary value, and/or adjustment mode value at step 603, then the method in step 603 synchronizes such acquired values. In an example, such values are synchronized in a time domain. In another example, such values are synchronized in a value domain. Alternatively, such synchronization may instead be performed later in the method, such as a part of step 604 described below.

The method proceeds from step 603 to step 604. In step 604, the values acquired in step 603—including, but not limited to at least one ICV, at least one force value, at least one auxiliary value, and/or at least one adjustment mode value—are stored in a historical values medium 605. If such values were not previously synchronized in step 603, the method may optionally synchronize such values in this step. In an example, such historical values storage medium 605 is a dynamic first-in-first-out ("FIFO") array. In an example, such historical values storage medium 605 may hold ten sessions of twenty (20) minutes each, which may be contiguous, for a total of 200 minutes of information, but other durations can be used depending upon available resources and implementation, such as, for example, 5 to 20 sessions, 7 to 15 sessions, etc. Similarly, the sessions may be longer or shorter (e.g., 10 to 30 minutes, 15 to 25 minutes, etc.). In an example, a dynamic FIFO array of values adds the newly arriving value to the top of the array and discards the oldest values at the bottom of the array.

The method proceeds from step 604 to either step 606 or step 609. The method proceeds from step 604 to step 606 if an adjustment mode value is not utilized. The method proceeds from step 603 to step 609 to determine an adjustment mode value. At step 609, the method optionally determines the adjustment mode value. In some embodiments, the outcome of step 609 is subsequently utilized by systems and methods disclosed herein to determine the aggressiveness with which the systems and methods disclosed herein damp the ICV. In an example, the adjustment mode value can represent a system's balance between performance and economy for a vehicle when applied to a system for adjusting inputs from an accelerator pedal position detector 401. In some embodiments, the systems and methods described herein apply adjustments to every ICV value and the adjustment mode value is utilized to determine the aggressiveness of the actual adjustment. In some embodiments, an adjustment mode value of zero corresponds to "disabled" while non-zero adjustment mode values correspond to escalating aggressiveness in identifying opportunities to adjust and making actual adjustments in later steps. Other values in other ranges might also be selected depending on implementation.

At step 610, the system determines whether the adjustment mode is disabled, for example, the adjustment mode value is set to zero. If it is determined that the adjustment mode is disabled at step 610, then the adjusted input control value is set to the same value as the input control value and the method proceeds to step 608. If it is determined that the adjustment mode is enabled at step 610, then the method proceeds to step 606.

At step 606, which is reached either after step 604 or step 610, the method analyzes the synchronized input control values and other values, such as force values, acquired by systems and methods disclosed herein. If such values were not previously synchronized, the method may optionally synchronize such values in this step prior to performing its analysis. The values are analyzed to determine a candidate damping value, which is a variable indicating the amount of adjustment to the input control value. The candidate damping value can be computed and/or mapped. The determination can be made by local processing within the system or by processors external to the system. In some embodiments, the candidate damping value is a mathematical value including, but not limited to, a coefficient. Systems and methods disclosed herein can use the outcome of this determination and the input control value to determine the adjusted input control value. Systems and methods disclosed herein can apply postprocessing to the candidate damping value. In one example, a value of zero corresponds to no damping while values from 1-100 correspond to escalating degrees of adjustment. Other values in other ranges might also be selected depending on implementation.

At step 607, the system determines the adjusted input control value using the input control value and the candidate damping value. In some cases, the adjusted input control value may be substantially similar or even identical to the input control value. The outcome of this determination can be used by systems and methods disclosed herein to communicate the adjusted input control value to the next system or process within the vehicle that uses such value.

At step 608, the method communicates the adjusted input control value to the next system or process that uses this value, such as the output receiving unit 209. The system or method that uses the adjusted input control value may be within the vehicle, or extra vehicular. In an example, the receiver of the communicated adjusted input control value may be one or more actuators that individually (or in combination) regulate the output force of a vehicle. The method proceeds from step 608 to step 603 to determine an adjusted input control value for a next cycle.

Figure 7:
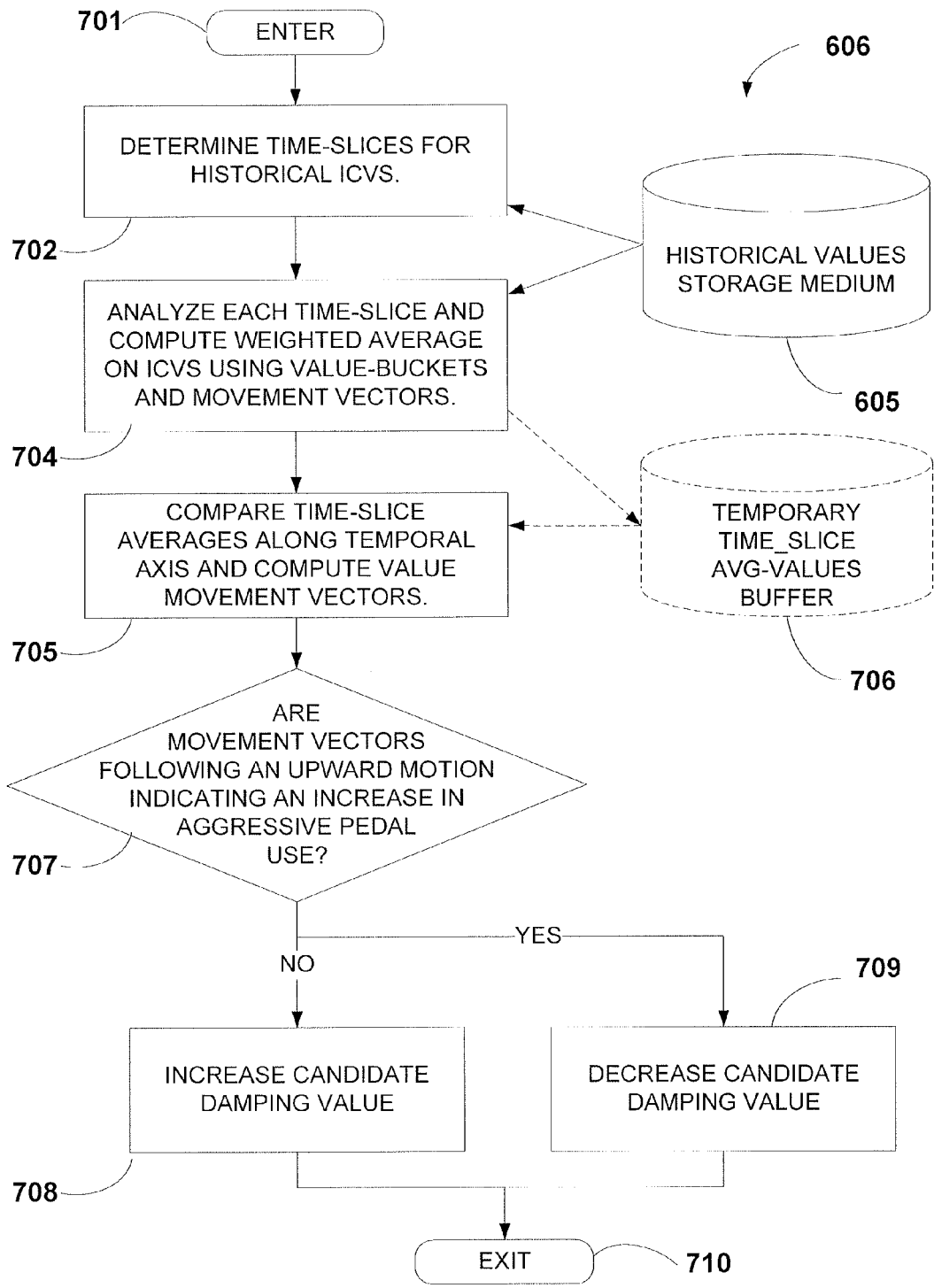
FIG. 7 illustrates a flow diagram depicting a method for determining a candidate damping value.

FIG. 7 illustrates a flow diagram depicting a method for determining a candidate damping value using range distribution and value-buckets, according to an embodiment. Generally, range distribution refers to a sorting algorithm that works by partitioning an array into a number of buckets and is particularly useful when data is distributed over a range. The method is included in method 606 illustrated in FIG. 6 and is entered at step 701. At step 702, the system utilizes historical values from a the historical values storage medium 605 of FIG. 6 to determine time-slices for subsequent analysis described herein of historical ICVS. At step 704, the system analyzes each time-slice and compute weighted average on ICVS using value-buckets and movement vectors. At step 706, the temporary Time-Slice Average-Values are stored to memory. At step 705, the method compares time-slice averages along a temporal axis to compute value movement vectors. At step 706, if movement vectors are following an upward motion, there is increase in "aggressiveness"—increased use of acceleration by the vehicle operator—and the method proceeds to step 709 to decrease the damping. Alternately, at step 706 if movement vectors are not following an upward motion, there is no increase in aggressiveness and the method proceeds to step 708 to increase the damping.

At step 708, the method increases the candidate damping value. At step 709, the method decreases the candidate damping value. The candidates damping value generated by either of steps 708 and 709 will be subsequently utilized by step 607 of FIG. 6 to determine the adjusted input control value. The method is exited at step 710.

Figure 8:
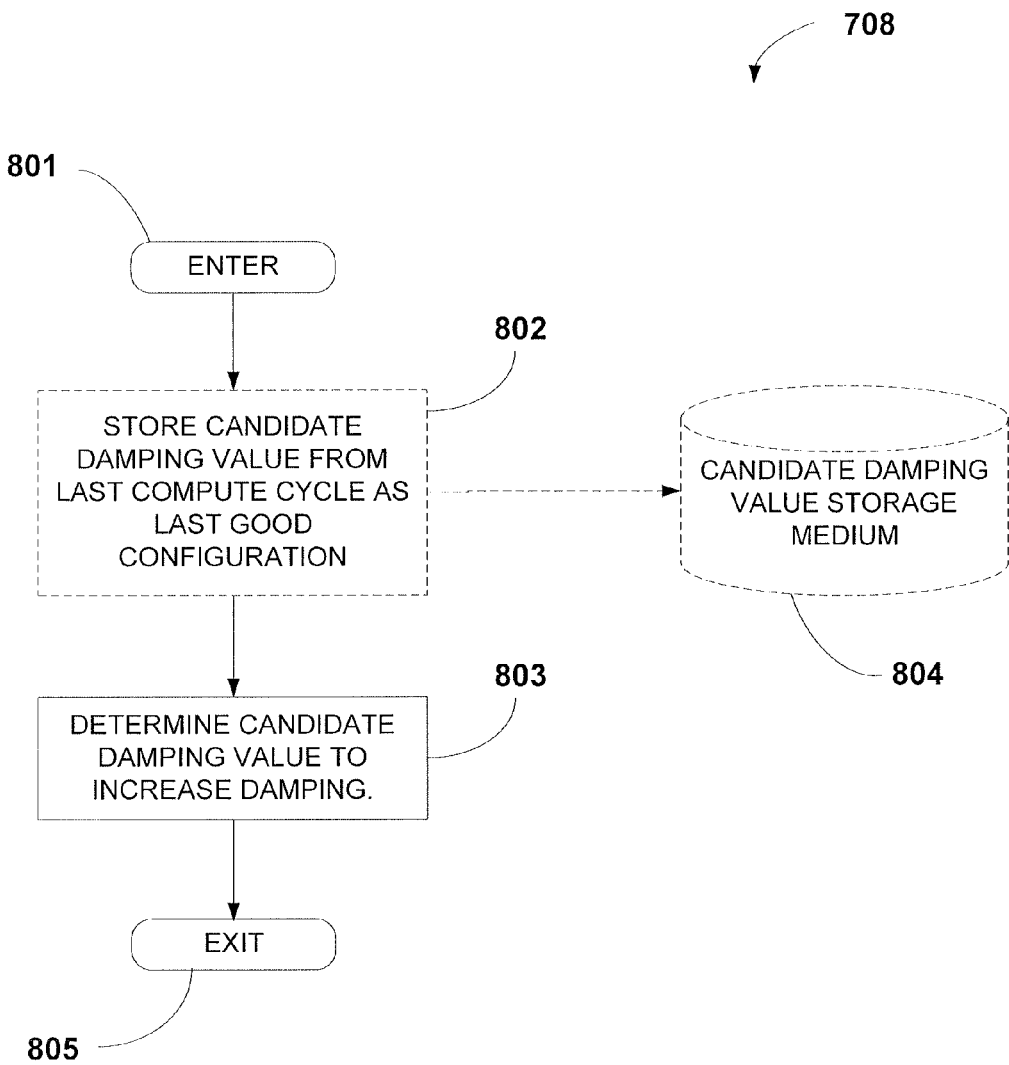
FIG. 8 illustrates a flow diagram depicting a method for determining an increased candidate damping value.

FIG. 8 illustrates a flow diagram 800 depicting a method for determining an increased candidate damping value according to an embodiment. The method is included in method 708 illustrated in FIG. 7. The method is entered at step 801. At optional step 802, the method optionally stores the candidate damping value from the last compute cycle as a last good configuration value stored in a candidate damping values storage medium 804. At step 803, the method determines the next candidate damping value by increasing the degree of damping. The candidate damping value can be computed and/or mapped in this step. The determination can be made by local processing within the system or by processors external to the system. In some embodiments, the candidate damping value is a mathematical value including, but not limited to, a coefficient.

Practitioners skilled in the art will recognize that the method illustrated in flow diagram 800 may be implemented without step 802 and the use of a candidate damping values storage medium 804 in an embodiment. Instead, the method may proceed from entering at step 801 to immediately determining the candidate damping value in step 803. The method is exited at step 804.

Figure 9:
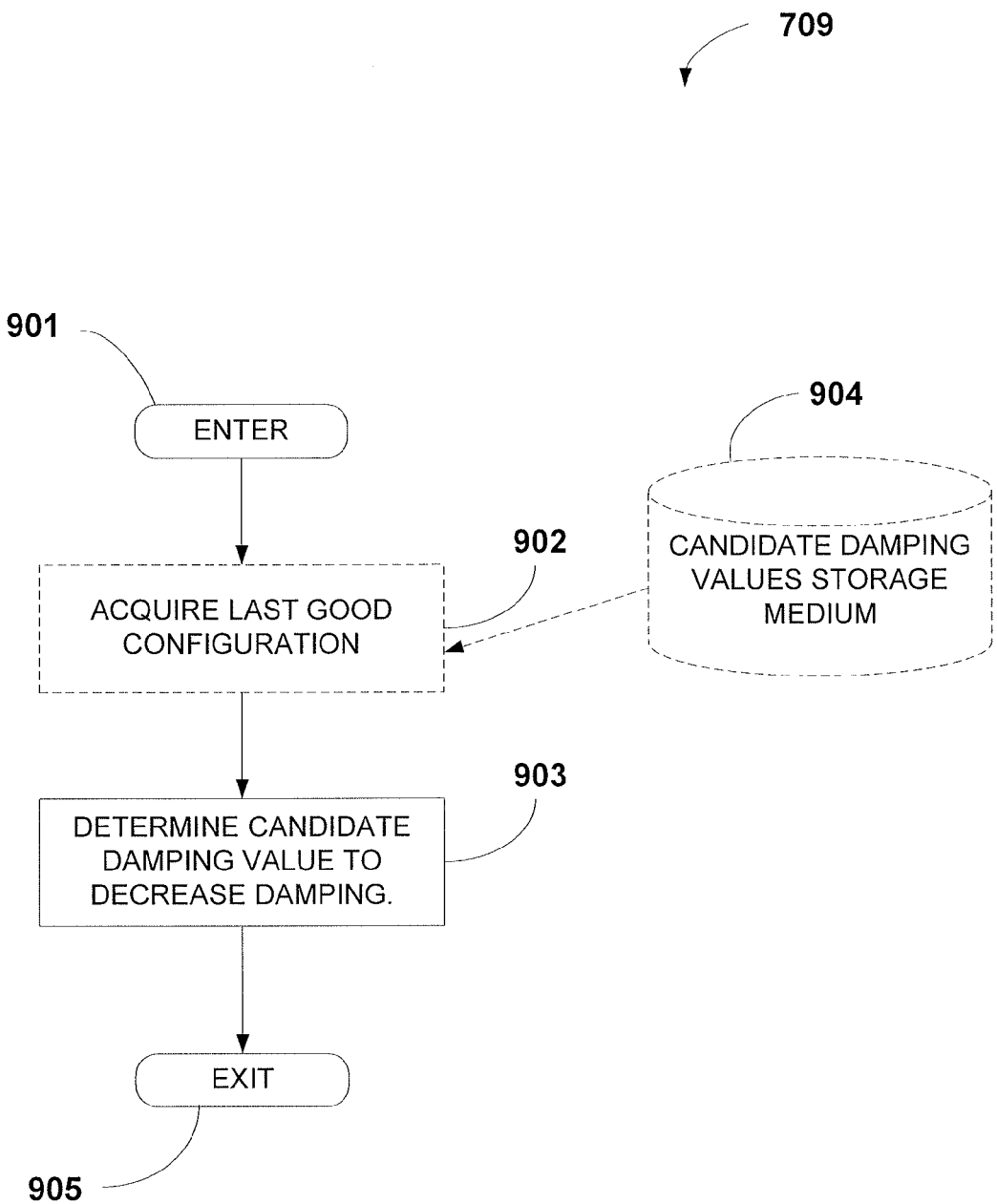
FIG. 9 illustrates a flow diagram depicting a method for determining a decreased candidate damping value.

FIG. 9 illustrates a flow diagram 900 depicting a method for determining a decreased candidate damping value according to an embodiment. The method is included in method 709 illustrated in FIG. 7 and entered at step 901. At optional step 902, the method optionally acquires from a candidate damping values storage medium 904 the last good configuration—i.e., the candidate damping value last utilized before the method detected an increase in aggressive use of the pedal by the vehicle operator. At step 903, the method determines the candidate damping value to decrease the degree of damping. The candidate damping value can be computed and/or mapped in this step. The determination can be made by local processing within the system or by processors external to the system. In some embodiments, the candidate damping value is a mathematical value including, but not limited to, a coefficient.

Practitioners skilled in the art will recognize that the method illustrated in flow diagram 900 may be implemented without step 902 and the use of a candidate damping values storage medium 904 in an embodiment. Instead, the method may proceed from entering at step 901 to immediately determining the candidate damping value in step 903, such as by, for example, incrementing by one or another numerical value the candidate damping value utilized in the previous compute cycle. The method is exited at step 905.

Figure 10:
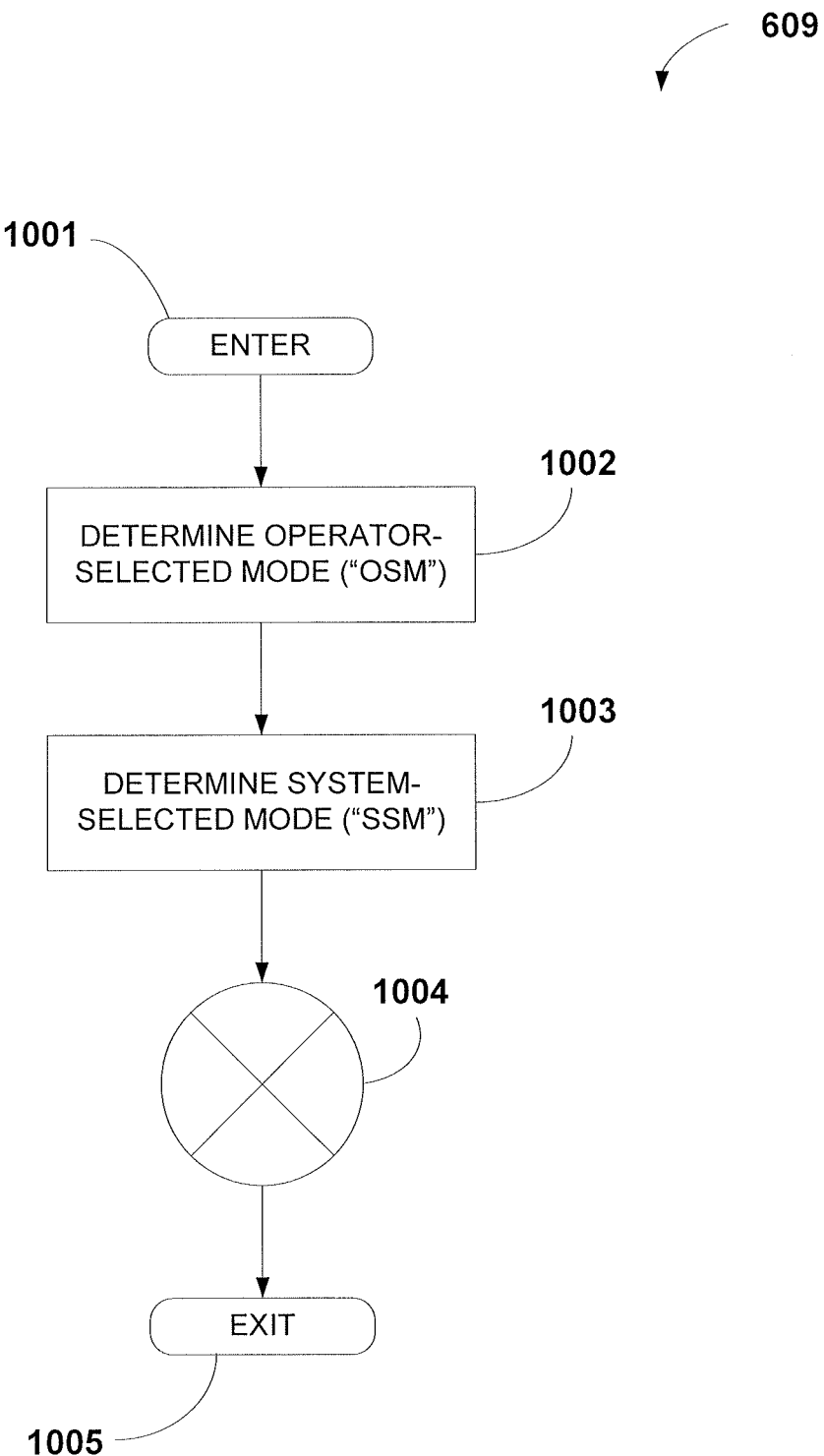
FIG. 10 illustrates a flow diagram depicting a detailed method for determining an adjustment mode value of FIG. 6 according to an embodiment.

FIG. 10 illustrates a flowchart of a method of utilizing an operator-selected mode and a system-selected mode to determine an adjustment mode value according to an embodiment. The method is included in method 609 illustrated in FIG. 6. The method is entered at 1001. The system determines an operator-selected mode ("OSM") at step 1002. OSM is a variable that corresponds to the value from an "operation mode" selector controlled by an operator of a vehicle, such as the mode signal output from a power mode switch (also known as an "ECO button" in lay terms). In an example, such operation mode selector is a power mode switch that allows an operator to select between an "ECONOMICAL" mode, a "NORMAL" mode, and a "POWER" mode, such as by depressing a moment switch or a toggle switch. The selection can affect other variables used by the vehicle for purposes of control, rate of acceleration, and so on.

Figure 11:
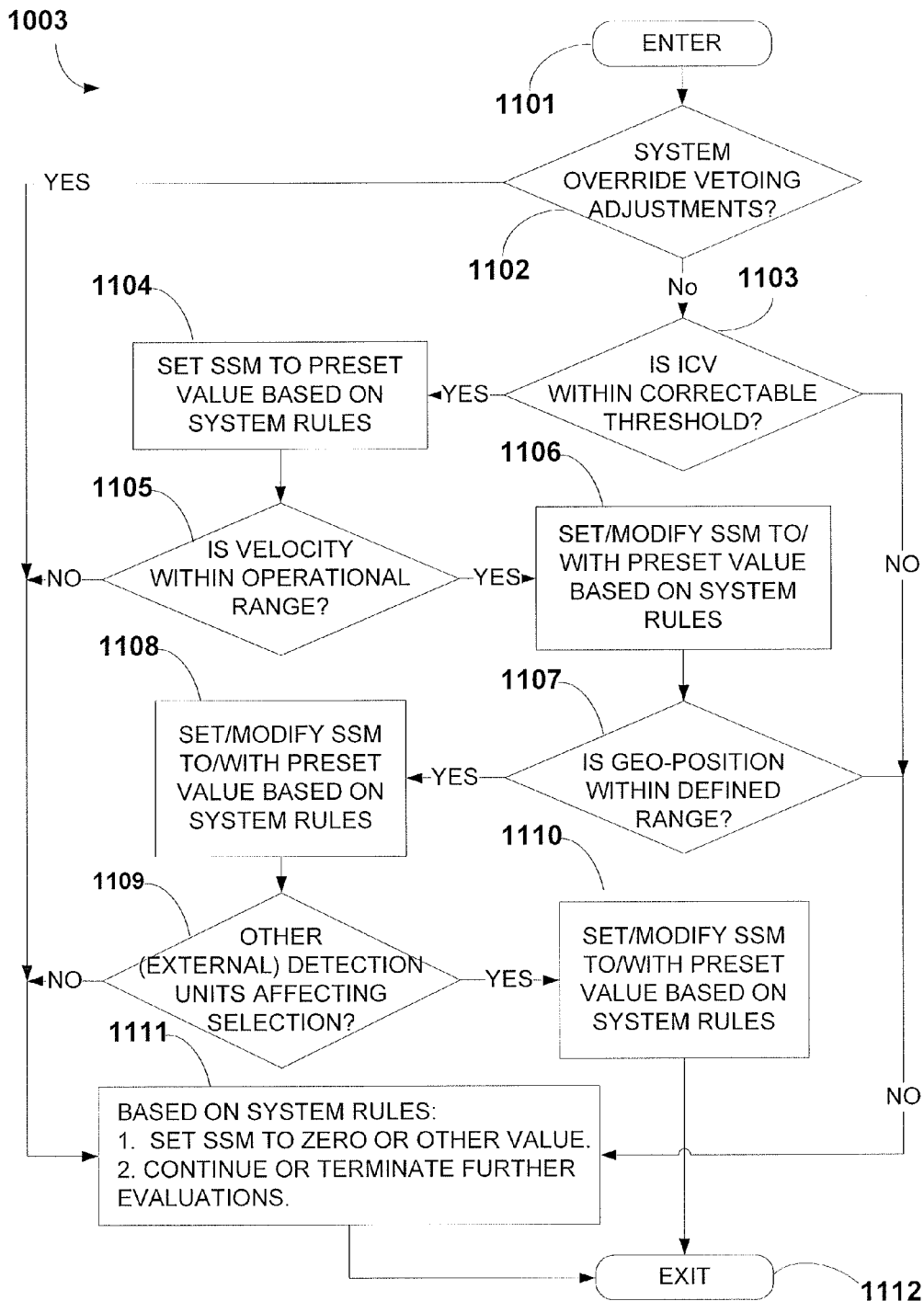
FIG. 11 illustrates a flow diagram depicting a detailed method for determining a system-selected mode of FIG. 10 according to an embodiment.

At step 1003, the system determines a system-selected mode ("SSM"). SSM is a variable that represents the control or influence of the system and methods described herein as well as other systems upon the adjustment mode value. The range of control or influence can extend from disabling adjustments by the system to decreasing or increasing the aggressiveness with which candidates for adjustment are detected and actual adjustments applied. The method can allow systems, both intra vehicular and extra vehicular, to influence or set the adjustment mode value via the SSM. Extra vehicular SSM can be communicated via telematics, for example. Intra vehicular SSM can be propagated by another controller, such as to initiate operation in a "fuel reserve" mode. FIG. 11 illustrates an exemplary method for determining a SSM.

At step 1004, the method combines OSM and SSM into an adjustment mode value. In an example, combination is made using rules and/or conditions. Combination can include methods discussed herein, summation, replacement of one value with another according to a preprogrammed weighted hierarchy, and other functions. For instance, a system-selected mode can be used instead of an operator-selected mode when certain operating parameters are met, such as a vehicle speed within a selected range. An example of processing a veto is depicted in FIG. 11. An adjustment mode value results from performing the combination at step 1004. In an example, an operator such as a manufacturer can instruct other systems to influence, override, or disable adjustments. The method in FIG. 11 offers an example of how such rules can be applied. The method is exited at step 1005.

FIG. 11 illustrates a flowchart depicting a method of determining a SSM according to an embodiment. In an example, the method is included in step 1003 shown in FIG. 10. The method is entered at step 1101. At 1102, the method determines whether the input control circuit or another system is generating a flag or instruction indicating that systems and methods for adjusting the input control value be overridden. In some embodiments, if such an override instruction exists, adjustment of the input control value is vetoed by, for example, by setting the adjustment mode value to zero. A system or method can issue a veto as part of a diagnostic or error-checking function. A veto can be triggered from any of several intra-vehicular or extra-vehicular sources or conditions, such as internal diagnostic fault, vehicle accident, or entry into combat mode.

In an example, a system or method, such as a military system or method, can detect the presence of combat conditions. In an example, an adjustment system can be enabled, but upon detection of a condition such as a combat condition (for example, weapon activation or sudden high-speed maneuver) the system can set the SSM to zero or no adjustment. Setting the SSM to zero can reduce risk of a reduction in vehicle responsiveness. Setting the SSM to zero can increase fuel consumption and can decrease operational range.

If it is determined that there is a system override present at step 1102, then the method proceeds to step 1111. If it is determined that there is not a system override present at step 1102, then the method proceeds to step 1103.

At step 1103, the method determines whether the ICV is within a correctable threshold. In an example, the range for the "correctable threshold" is selected, such as by a manufacturer. In an example, the method does not process changes to a "null" or "zero" reading for the ICV. In an example, a manufacturer can preprogram an accelerator pedal position controller not to make corrections when the operator is using a high level of acceleration, such as during an emergency condition or when entering traffic from an on-ramp. If it is determined that the ICV is not within a correctable threshold at step 1103, then the method proceeds to step 1111. If it is determined that the ICV is within a correctable threshold at step 1103, then the method proceeds to step 1104.

At step 1104, the method sets the SSM to a preset or preprogrammed value based on a predetermined or preprogrammed rule. System policies can be selected by a manufacturer, in an example. The method then proceeds to step 1105.

At step 1105, the method detects whether the velocity of the vehicle is within the operational range for making corrections to the adjustment mode value. In an example, this determination presents an opportunity for manufacturers to implement rules that prevent an accelerator position controller from making corrections in certain circumstances. Circumstances may include, but are not limited to, the vehicle traveling at a low rate of speed below a selected minimum, or a high rate of speed above a selected maximum. If it is determined that the velocity is not within the operational range, then the method proceeds to step 1111. If it is determined that the velocity is within the operational range, then the method proceeds to step 1106.

At step 1106, the method modifies the SSM with a value based on a predetermined or preprogrammed rule, such as an instruction preprogrammed into an accelerator position controller. In an example, a manufacturer can implement rules that provide for more correction when the vehicle is not traveling at high speeds above a predetermined or preprogrammed speed, or at low rates of speed below a predetermined or preprogrammed speed. The method then proceeds to step 1107.

At step 1107, the method determines whether the physical position of the vehicle is within an operational geo-positional range or set of ranges. In an example, operational ranges are selected by entities including, but not limited to, manufacturers, a location service provider, an operator or another entity or group of entities. The geo-position of the vehicle may result in the application of different rules, for example if the vehicle is determined to be off-road versus on-road. By way of another example, certain geo-political zones may be designated as high fuel-economy zones. If it is determined that the physical position is within a defined range, then the method proceeds to step 1108. If it is determined that the physical position is not within a defined range, then the method proceeds to step 1111.

In some embodiments, upon determining that the physical position is not within a defined range at step 1108, the method can instead proceed to 1109, foregoing modification of the SSM based on geo-position results, but nevertheless continuing the evaluation process. Such an approach can result in additional modification of the SSM due to the results of other determinations.

At step 1108, the method modifies the SSM with a value based on a predetermined or preprogrammed policy corresponding to the geo-position results in step 1108. The method then proceeds to step 1109.

At step 1109, the method determines whether other sensors and systems, including those outside the vehicle, influence the SSM. For example, a vehicle may communicate directly or indirectly with nearby vehicles regarding environmental conditions on a pathway. In another example, a vehicle may communicate with an extra-vehicular storage medium that provides information about environmental conditions on a pathway, such as an approaching incline. If it is determined that there are other sensors and systems influencing the SSM, then the method proceeds to step 1110. If it is determined that there are not other sensors and systems influencing the SSM, then the method proceeds to step 1111.

At step 1110, the method modifies the SSM with a value based on selected rules corresponding to data provided by other sensors and systems as determined in step 1109. The method is exited at step 1112.

At step 1111, the method disables adjustments in response to data from sensors or instructions produced by the method or associated systems. In an example, to disable adjustments, in 1111 the method sets the SSM to zero or another value based on a predetermined or preprogrammed system policy. Step 1111 is reached by a "YES" determination in step 1102 or a "NO" determination to any of steps 1103, 1105, 1107, or 1109. The method is exited at step 1112.

It is understood that the exemplary method of FIG. 11 shows exemplary criteria and methodologies for setting and/or modifying an SSM value. It is understood that additional, fewer, or alternative criteria and/or methods can be applied to set and/or modify an SSM value.

In an exemplary application previously described, a map can be generated that associates specific acceleration profiles and fuel (or electrical energy) consumption levels and patterns with specific route segments. Such a map can be used to dynamically adjust the aggressiveness of adjustments made by the input control system to maximize fuel efficiency over those segments. In certain aspects, the map may also be used to determine any change in aggressiveness by the operator between past and current travel over a specific route. For example, step 606 of FIG. 6 may employ such a map. The SSM may then be adjusted to accommodate such an application.

Figure 12:
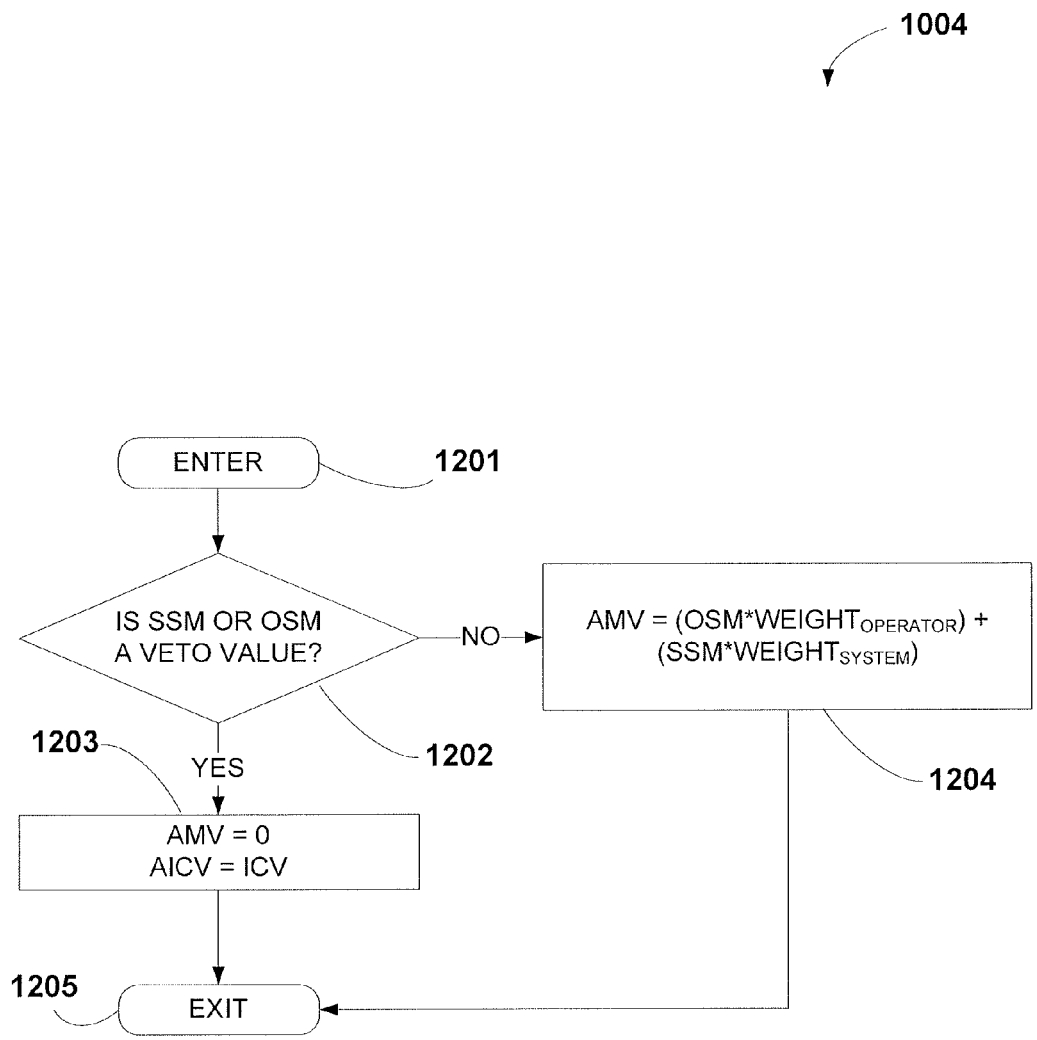
FIG. 12 illustrates a flow diagram depicting a detailed method for utilizing a weighted average to combine at least one operator-selected mode and at least one system-selected mode to determine an adjustment mode value of FIG. 10 according to an embodiment.

FIG. 12 illustrates a flowchart of a method of utilizing an OSM and SSM to determine an adjustment mode value according to an embodiment. The method is included in method 1004 illustrated in FIG. 10 and entered at step 1201. At step 1202, the method queries whether OSM or SSM include a veto value. If a veto is present, then at step 1203 the adjustment mode value is set to zero, which indicates no correction is to be made to the input control value, and the adjusted input control value is set to the input control value, in an embodiment.

If it is determined at step 1202 that the OSM and/or SSM do not include a veto value, then at step 1205 the adjustment mode value is set to a weighted ("WT") average of OSM and SSM, in an embodiment. The value of WT for the OSM or SSM can be either preselected or dynamically adjusted based on manufacturer and/or operator rules and/or preferences. Other methods of computing AMV can also be implemented. The method exits at step 1205.

The above-cited patents and patent publications are hereby incorporated by reference in their entirety. The above method, apparatus, and system have been described in both general terms and more specific terms, including a small sample of exemplary applications. The present application has been described in terms of specific embodiments incorporating details to facilitate the understanding of the principles of construction and operation of the vehicle input control optimization system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An apparatus for optimizing a vehicle's performance, the apparatus comprising:
   a non-transitory data storage device; and
   a processor operatively coupled to the non-transitory data storage device, and configured to:
   determine an input control value reflecting a vehicle's input control mechanism's position, wherein said input control value is stored to said non-transitory data storage device;
   determine and store a candidate damping value;
   adjust the input control value in accordance with the candidate damping value to yield an adjusted input control value;
   determine an output signal reflecting said adjusted input control value;
   communicate said output signal to an output receiving unit; and
   detect whether the vehicle operator's handling of the vehicle's input control mechanism has changed in response to communication of the output signal to the output receiving unit, wherein a change in the vehicle operator's behavior is detected based at least in part on an unexpected change in the input control mechanism's position over a predetermined time period,
   wherein, if a change in the vehicle operator's behavior is detected, the processor incrementally adjusts the output signal in accordance with a corresponding decreased candidate damping value until the change in the vehicle operator's behavior is mitigated, and
   wherein the processor is configured to:
   determine and store an increased candidate damping value if no change in the vehicle operator's behavior is detected,
   adjust the adjusted input control value in accordance with the increased candidate damping value to yield a second adjusted input control value, and
   communicate a second output signal reflecting said second adjusted input control value to the output receiving unit.

2. The apparatus of claim 1, wherein the non-transitory data storage device is pre-populated with a plurality of optimized acceleration curves.

3. The apparatus of claim 1, wherein said candidate damping value is determined using data collected from said vehicle using a closed-loop system.

4. A method of controlling a vehicle, the method comprising:
   determining an input control value reflecting a position of an input control mechanism of the vehicle;
   determining a candidate damping value;
   adjusting the input control value in accordance with the candidate damping value to yield an adjusted input control value;
   determining an output signal reflecting said adjusted input control value;
   communicating said output signal to an output receiving unit;
   detecting whether a vehicle operator's handling of the vehicle's input control mechanism has changed in response to adjusting the input control value;
   if a change in the vehicle operator's behavior is detected, incrementally adjusting the output signal in accordance with a corresponding decreased candidate damping value until the change in the vehicle operator's behavior is mitigated; and if no change in the vehicle operator's behavior is detected:
determining a subsequent candidate damping value, and
adjusting the adjusted input control value in accordance with the subsequent candidate damping value to yield a second adjusted input control value, and
communicating a second output signal reflecting said second adjusted input control value to the output receiving unit.

5. The method of claim 4,
wherein the subsequent candidate damping value is an increased candidate damping value.

6. The method of claim 4, further comprising the steps of:
adjusting the adjusted input control value to a last accepted configuration value if a change in the vehicle operator's behavior is detected.

7. The method of claim 4, wherein the candidate damping value is determined based at least in part on an optimized acceleration curve.

8. The method of claim 4, wherein the steps of determining the subsequent candidate damping value, and adjusting the adjusted input control value in accordance with the subsequent candidate damping value are repeated until a change in the vehicle operator's behavior is detected, at which point the adjusted input control value is incrementally adjusted in accordance with a corresponding decreased candidate damping value until a predetermined condition is met.

9. The method of claim 4, wherein a change in the vehicle operator's behavior is detected based at least in part on an unexpected change in the input control mechanism's position over a predetermined time period.

10. The method of claim 4, further comprising the step of:
generating an optimized acceleration curve using data collected on board of the vehicle.

11. The method of claim 10, wherein the candidate damping value is determined using data collected via a closed-loop system.

12. The method of claim 10, wherein the candidate damping value is determined using data collected via an open-loop system.

13. An input control optimization system for controlling a vehicle, the input control optimization system comprising:
a non-transitory data storage device; and
a processor coupled to the non-transitory data storage device, the processor configured to:
determine a candidate damping value;
adjust an input control value in accordance with the candidate damping value to yield an adjusted input control value, wherein said input control value reflects a position of the vehicle's input control mechanism;
communicate said adjusted input control value to an output receiving unit;
detect whether a vehicle operator's handling of the vehicle's input control mechanism has changed in response to communication of the adjusted input control value to the output receiving unit;
responsive to detecting a change in the vehicle operator's behavior, incrementally adjusting the input control value in accordance with a corresponding decreased candidate damping value until the change in the vehicle operator's behavior is mitigated; and
responsive to detecting no change in the vehicle operator's behavior:
determining a subsequent candidate damping value,
adjusting the adjusted input control value in accordance with the subsequent candidate damping value to yield a second adjusted input control value, and
communicate said second adjusted input control value to the output receiving unit.

14. The input control optimization system of claim 13, wherein the processor is further configured to:
determine an output signal reflecting said adjusted input control value; and
communicate said output signal to the output receiving unit instead of the adjusted input control value.

15. The input control optimization system of claim 13, wherein the processor is further configured to:
adjust the adjusted input control value to a last accepted configuration value if a change in the vehicle operator's behavior is detected.

16. The input control optimization system of claim 13, wherein
the subsequent candidate damping value is determined based at least in part on an optimized acceleration curve, and
wherein a change in the vehicle operator's behavior is detected based at least in part on an unexpected change in the input control mechanism's position over a predetermined time period.

17. The input control optimization system of claim 13, wherein the steps of determining the subsequent candidate damping value and adjusting the adjusted input control value in accordance with the subsequent candidate damping value are repeated until the vehicle operator's behavior changes in response to communication of the adjusted input control value to the output receiving unit.

18. The input control optimization system of claim 13, wherein the processor is configured to generate an optimized acceleration curve using data collected on board of the vehicle.

19. The input control optimization system of claim 18, wherein the candidate damping value is determined using data collected from a closed-loop system.

20. The input control optimization system of claim 18, wherein the candidate damping value is determined using data collected from an open-loop system.

* * * * *